(12) United States Patent
Tobiason et al.

(10) Patent No.: US 7,400,414 B2
(45) Date of Patent: Jul. 15, 2008

(54) HAND-SIZE STRUCTURED-LIGHT THREE-DIMENSIONAL METROLOGY IMAGING SYSTEM AND METHOD

(75) Inventors: Joseph Daniel Tobiason, Woodinville, WA (US); Michael Nahum, Kirkland, WA (US); Paul Gladnick, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 297 days.

(21) Appl. No.: 11/263,600

(22) Filed: Oct. 31, 2005

(65) Prior Publication Data

US 2007/0097381 A1    May 3, 2007

(51) Int. Cl.
*G01B 11/24* (2006.01)
(52) U.S. Cl. ...................................... 356/607; 356/396
(58) Field of Classification Search ................. 356/607, 356/396
See application file for complete search history.

(56) References Cited

U.S. PATENT DOCUMENTS

| | | | | |
|---|---|---|---|---|
| 5,102,224 | A | * | 4/1992 | Uesugi et al. ............... 356/607 |
| 5,164,793 | A | * | 11/1992 | Wolfersberger et al. ..... 356/607 |
| 5,805,289 | A | | 9/1998 | Corby, Jr. et al. |
| 5,886,775 | A | * | 3/1999 | Houser et al. .............. 356/4.01 |
| 6,442,857 | B1 | | 9/2002 | Atsuhiko et al. |
| 6,980,302 | B2 | * | 12/2005 | Knighton et al. ............ 356/607 |
| 7,003,161 | B2 | | 2/2006 | Tessadro |
| 7,324,217 | B2 | * | 1/2008 | Herrmann et al. ........... 356/607 |
| 2006/0017937 | A1 | * | 1/2006 | Vaccaro et al. .............. 356/607 |

OTHER PUBLICATIONS

U.S. Appl. No. 11/096,497, filed Oct. 5, 2006, Yu et al.

*HS300 Series Sensor*, © Origin Technologies Corporation, Madison, Alabama, as early as Jul. 2005, 2-page brochure.
*HS330 Series Sensor*, © Origin Technologies Corporation, Madison, Alabama, as early as Jul. 2005, 2-page brochure.
*HS400 Series Sensor*, © Origin Technologies Corporation, Madison, Alabama, as early as Jul. 2005, 2-page brochure.
*HS600 Series Sensor*, © Origin Technologies Corporation, Madison, Alabama, as early as Jul. 2005, 2-page brochure.
*HS610 Series Sensor*, © Origin Technologies Corporation, Madison, Alabama, as early as Jul. 2005, 2-page brochure.
"Laser Light Sectioning in Scheimpflug-Configuration," as early as Jul. 2005, 1 page.
Merklinger, H.M., "Principles of View Camera Focus," © May 1996, 7 pages.

(Continued)

*Primary Examiner*—L. G. Lauchman
*Assistant Examiner*—Rebecca C Slomski
(74) *Attorney, Agent, or Firm*—Christensen O'Connor, Johnson Kindness PLLC

(57) ABSTRACT

A hand-size structured-light three-dimensional metrology imaging system and method. Laser illumination stripes are scanned across a workpiece surface for obtaining z-height and x-coordinate information. A Scheimpflug configuration is used. Utilizing this configuration, a laser illumination stripe across a raised workpiece portion will be shown in a contour image at the image sensor in a focused manner, such that the offsets along the contour image line due to the raised portions of the workpiece surface can be accurately converted to a z-height measurement. The y-axis positions associated with each of the contour images, used for reassembling the information from the contour images into a surface map for the workpiece, may be determined without the need for a position sensor, by including a reference object in the contour images.

16 Claims, 22 Drawing Sheets

OTHER PUBLICATIONS

*RS400 Series Sensor*, © Origin Technologies Corporation, Madison, Alabama, as early as Jul. 2005, 2-page brochure.

Simoni A., et al, "2.1: Integrated Optical Sensors for 3-D Vision," *Proceedings of the First IEEE Conference on Sensors*, Orlando, Florida, Jun. 12-14, 2002, pp. 1-4.

*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.

*QVPAK 3D CNC Vision Measuring Machine User's Guide*, Version 7.0, 1st ed., Manual No. 99MCB225A, Series No. 359, Mitutoyo Corporation & Micro Encoder Inc., Kanagawa, Japan, Jan. 2003.

* cited by examiner

HAND-SIZE STRUCTURED-LIGHT THREE-DIMENSIONAL METROLOGY IMAGING SYSTEM AND METHOD

FIELD OF THE INVENTION

The present invention relates to metrology systems, and more particularly, to a "hand-size" self-contained structured-light three-dimensional metrology imaging system and method.

BACKGROUND OF THE INVENTION

Measurement instruments using machine vision technology are widely used in quality assurance for both conventional and micro-sized parts and assemblies of machines, medical devices, and semiconductor products, etc. Most commercially available machine vision systems for dimensional measurement are desktop-sized or larger. In general, such systems lack mobility and flexibility with regard to the fact that a large percentage of dimensional measurements are manually performed in workshops, office spaces, and at other sites that are too remote or inconvenient for access by a desktop-sized machine vision metrology system. Smaller, "hand-size" type dimensional measurement instruments, whether using cameras, structured light triangulation, or contact measurement methods, generally provide 1- or 2-dimensional measurements. Furthermore, such instruments generally lack the flexible semi-automated video tools, and/or automatic measurement routine capabilities, that are used for measurement and analysis of images in larger machine vision systems.

The present invention is directed to providing a system and method that can overcome the foregoing and other disadvantages. More specifically, the embodiment of the present invention is directed to a hand-size structured-light three-dimensional metrology imaging system and method for obtaining three-dimensional measurements of measured objects.

SUMMARY OF THE INVENTION

A compact structured-light three-dimensional (3D) metrology imaging system and method are provided. It may be a "hand-size" instrument, in the sense that it is easily carried with one hand, includes a self-contained set of operating controls and display, and is positioned or operated manually. in accordance with one aspect of the invention, the instrument is moved across a workpiece such that a laser illumination stripe scans the workpiece and is imaged onto a detector array (an image sensor), for obtaining measurement results. A Scheimpflug configuration may be utilized in which the image sensor plane, lens plane and a desired plane of best focus all intersect in the same line. The line of intersection in nominally parallel to an x-axis of measurement. The desired plane of best focus is nominally parallel to the x-axis and z-axis of measurement. Utilizing this configuration, when the laser illumination stripe is aligned in the x-z plane and strikes an irregular or tilted workpiece surface at various z-heights, it will be shown at the image sensor in a focused manner, despite the z-height variations. Accordingly, the z- and x-coordinates of the surface features that are illuminated can be accurately measured by analyzing the irregular laser illumination stripe image that corresponds to the illuminated surface features. The laser illumination stripe image is typically referred to as a contour image, herein. In particular, z-axis variations of the surface features may be determined as a function of the corresponding variations in the contour image.

In accordance with another aspect of the invention, multiple contour images are obtained as the instrument is moved along the y-axis across the workpiece, and the information from the contour images is assembled into an overall surface map (a 3D surface map) of the measured portion of the workpiece. In one embodiment, a y-axis relative coordinate determining technique that requires no additional sensors is utilized to obtain the y-axis coordinate associated with each contour image that is used for assembling the surface map. In other words, the pixel coordinates parallel to the x-axis across the contour image provide the x-axis information, and the offsets (displacements) of the contour image, along a direction perpendicular to the x-axis provide z-axis information. A technique that requires no additional sensors is utilized for obtaining the y-axis coordinate associated with each of the contour images, so that the information from the contour images can be reassembled into an overall 3D surface map for the workpiece.

In one embodiment, the y-axis relative coordinate determining technique utilizes a reference object (e.g., a ramp with a known slope) which is placed next to the measured workpiece. A portion of the laser illumination stripe, for example the end of the stripe, is extended over the reference object (e.g., the ramp), so a corresponding portion of the contour image will show an offset that is indicative of the z-height of the illuminated portion of the ramp. In this manner, the information obtained from the offset at the end of the contour image (e.g., corresponding to the current height of the illuminated part of the ramp) can be converted (using the known slope of the ramp) into the needed y-axis coordinate information for the given contour image. Once the relative position associated with each contour image is determined along the y-axis, the information from the scanned contour images can be reassembled into an overall 3D surface map for the workpiece. In one embodiment, the current height of the ramp can also be utilized as a reference for the height of other features on the measured workpiece. For example, the z-height information for a given feature may be calculated in terms of a delta calculation wherein the height of the given feature is determined relative to the current height of the ramp.

In another embodiment, the y-axis coordinate determining technique may utilize a separate illumination source, such as an LED strobe source or the like, in addition to the laser illumination stripe source. In conjunction with each contour image, a conventional image is acquired, for example, by strobing the two sources in rapid succession and capturing corresponding images in the shortest time possible. Using known image correlation techniques, the displacement of the conventional workpiece image across the image sensor, between two images, may be determined with sub-pixel accuracy, and this may be converted to a relative y-coordinate displacement based on the known optical geometry, pixel spacing, and magnification. Relative y-coordinate changes between contour images may be determined by interpolating between the relative y-coordinate changes of a set of correlated conventional images, if necessary.

In accordance with another aspect of the invention, the hand-size device can be used to measure not only the dimensions of small parts which have been measured by conventional handheld tools such as a caliper or micrometer, but also very small parts and miniature features on a surface, which are difficult or impossible to engage with contact type metrology tools. The non-contact image-based measurement method used also facilitates non-destructive measurements, for the measuring of soft or fragile objects.

In accordance with another aspect of the invention, the metrology device may include an imaging portion, a display portion, a signal processing and control portion, a scan acquisition activation element, and a user interface. The user interface may include user configurable or adjustable video measurement tools, also referred to simply as "video tools", that are configurable relative to an image (which may be a surface map) on the display portion, and video measurement tool adjusting elements. The device may also include preprogrammed measurement functions that operate to provide three-dimensional measurement results for various features in an image based on the configurations of the associated video measurement tools.

In accordance with another aspect of the invention, the user-adjustable video measurement tools may include a manual point-to-point distance measurement tool and a point-to-line distance measurement tool. In addition, a preprogrammed measurement function associated with the point-to-line distance measurement tool and/or or other tools may provide an automatic edge detection for at least one workpiece edge feature in a region of interest indicated by the configuration of the point-to-line distance measurement tool or other tool, and determine the location of the line based on the results of the automatic edge detection.

In accordance with another aspect of the invention, the user-adjustable video measurement tools may include functions for measuring the heights or distances of various three-dimensional features of the workpiece. In one embodiment, one or more video tools usable on the surface map may allow designation of a reference height region of the surface map. One or more video tools may automatically determine the highest point, lowest point, or maximum height difference, in a region of interest (which may include an entire surface map).

In accordance with another aspect of the invention, the device may include one or more alignment fixtures. The alignment fixtures may be interchangeably attached to or guide the metrology device to hold it at a desired focusing distance and/or orientation relative to a workpiece, for improving the imaging and/or measurement results. The alignment fixtures may also have a mechanism to help establish a correct and/or repeatable orientation of a workpiece and/or reference object relative to the metrology device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
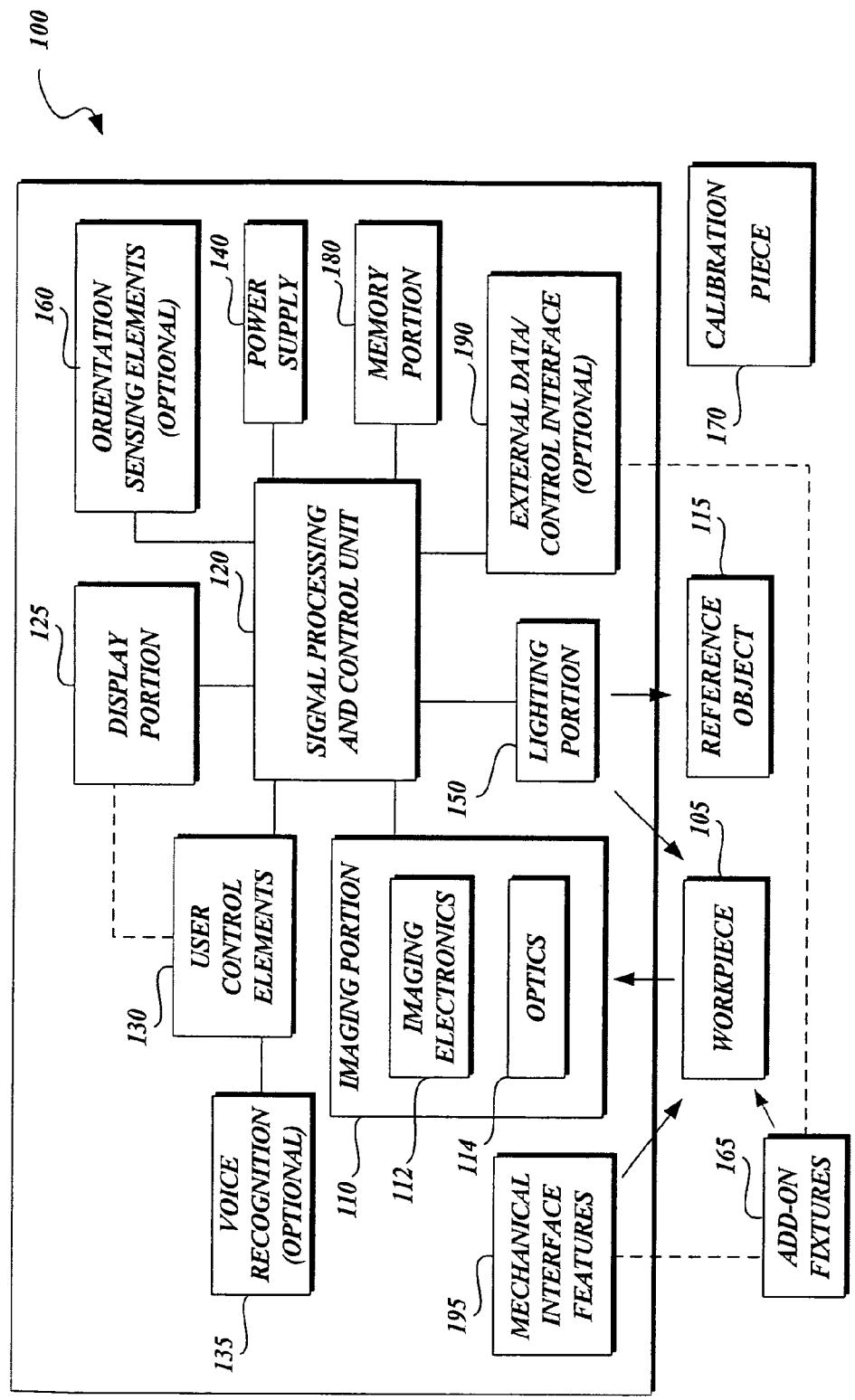
FIG. 1 is a block diagram of a hand-size structured-light three-dimensional metrology imaging system in accordance with the present invention.

FIG. 1 is a block diagram of a hand-size structured-light three-dimensional metrology imaging system 100 (also referred to as the metrology system 100) in accordance with the present invention. The hand-size structured-light three-dimensional metrology imaging system 100 includes an imaging portion 110, a signal processing and control unit 120, a display portion 125, user control elements 130, a voice recognition portion 135, a power supply 140, a lighting portion 150, orientation sensing elements 160, add on fixtures 165, a memory portion 180, an external data/control interface 190, and mechanical interface features 195. The various portions of the hand-size structured-light three-dimensional metrology imaging system 100 may be interconnected by one or more power and signal bus connections, or by individual dedicated connections. Various signal interconnections may be made by wireless and/or optical means, if desired.

The hand-size structured-light three-dimensional metrology imaging system 100 is utilized to obtain three-dimensional measurements of a workpiece 105. As will be described in more detail below, structured-light (e.g., a laser illumination stripe) may be used in combination with a triangulation configuration, to detect the contours of the workpiece 105. In a preferred embodiment, a Scheimpflug configuration may be used, such that the laser illumination stripe image (the "contour image") will be precisely focused on a detector. The x- and z- measurement coordinates of illuminated features along the laser illumination stripe on the workpiece may be determining by analyzing the "image sensor coordinates" of the corresponding features in the contour image, as describe in greater detail below. After a plurality of contour images covering a desired portion of the workpiece are acquired and recorded, a y-axis coordinate determining technique can be utilized for determining the y-axis measurement coordinate associated with each of the contour images, that is, the y-axis coordinate of the laser illumination stripe associated with each of the contour images. Once the y-axis coordinate associated with each of the contour images is determined, the (x,y,z) information from the contour images can be reassembled to produce an overall surface map of the workpiece. In one embodiment, the y-axis coordinate determining technique may include illuminating a reference object (e.g., a ramp) with a portion of the laser illumination stripe and analyzing the corresponding portion of the contour image. In other embodiments, a correlation-type displacement technique based on conventional imaging may be used, as described in greater detail below. It should be appreciated that both of these techniques have the advantage that they can be accomplished without using an additional displacement sensor. In various other embodiments, this advantage may be provided by any other now-known or later-developed y-coordinate determining technique that can be accomplished without using an additional displacement sensor.

As shown in FIG. 1, the imaging portion 110 includes imaging electronics 112 and optics 114, e.g., a lens, and/or other suitable optical component(s), if needed. The imaging electronics 112 includes an image sensor (also called a detector, or an array detector) that may be a CCD, CMOS or other type of image acquisition device, and may include local control and I/O circuitry for the image sensor, if appropriate. In general, the imaging portion 112 acquires images of laser illumination stripes on the workpiece 105 being measured, at an image plane where the image sensor is positioned. In one exemplary embodiment, the imaging portion 110 may provide a magnification of approximately 1.0 and a numerical aperture (NA) of approximately 0.025. The depth of focus may be approximately +/−2.8 mm. The imaging electronics 112 may provide a two-dimensional image acquisition device having approximately 1280 pixels by 1024 pixels, although fewer rows, for example 480 rows, may be output and processed in various applications. In one embodiment, using a 4.65 micrometer pixel pitch and a magnification of approximately 1.0, an imaged field of view that is approximately 6 mm wide may be provided. Using known methods of image processing that provide sub-pixel edge or feature location resolution, and a magnification of approximately 1.0, measurement resolution on the order of 5-10 microns may be provided, depending on the fineness of the laser illumination stripe line and limitations of the optics 114, as well as the actual focus accuracy provided by a user for a particular image. However, it will be appreciated that the foregoing imaging parameters are exemplary only, and not limiting. For example, if the optics provide for imaging a larger field of view, somewhat coarser measurement resolution may be provided. Conversely, imaging a smaller field of view with higher magnification may provide finer measurement resolution. Interchangeable lenses, may be included in various embodiments, to facilitate the measurement of workpieces of different sizes at different magnifications.

The signal processing and control unit 120 includes a data processing unit, which may be provided by an electronic chip, such as a DSP or a microcontroller. This unit assumes the tasks of image processing, calculating, and outputting. The display portion 125 may include a touch screen LCD, and may be operable to provide a GUI. The user control elements 130 may be provided on a control panel, which may have a number of dials, thumb sticks, scroll wheels, buttons, or the like, and/or by various elements implemented on a touch screen panel of the display portion 125, or the like. The power supply 140 may be integrated in the device, and may comprise batteries and/or a solar cell, and a voltage regulator, or it may use power from an electrical outlet that may be converted to a suitable voltage range by a transformer, or the like.

The lighting portion 150 may include illumination control circuitry, which may include illumination power control circuitry and illumination timing circuitry that may be suitable for driving illumination sources, and that may operate under the control of, or in cooperation with, the signal processing and control unit 120. As will be described in more detail below, a primary function of the lighting portion 150 is to provide a laser illumination stripe which is scanned by the user across the surface of a workpiece for determining z-height information. Optionally, additional light sources may also be included, for example, a white light source, or other suitable conventional-imaging light source, may be included if a conventional imaging mode is desired.

The external data/control interface 190 may comprise suitable signal conditioning and/or interface protocol circuitry; as well any desired connector configuration(s), such that accessories, such as controllable types of add-on fixtures 165, may be conveniently interfaced to the hand-size structured-light three-dimensional metrology imaging system 100. Portions of the external data/control interface 190 may be provided by, or merged with and indistinguishable from, the signal processing and control unit 120. The external data/control interface 190 may also include a wired or wireless transmitting/receiving unit, which is used to transmit, or receive information to or from computers, instruments, or other devices usable in combination with the hand-size structured-light three-dimensional metrology imaging system 100. Such devices may provide programs or instructions that are created remotely from the hand-size structured-light three-dimensional metrology imaging system 100, for example by text-based programming, by a compatible program associated with a larger automated vision metrology system or other programming interface provided on a PC, or by a separate identical or compatible hand-size metrology imaging system. The programs or instructions may correspond to workpieces that are to be inspected using the hand-size structured-light three-dimensional metrology imaging system 100, and may be downloaded or executable under control of the signal processing and control unit 120 through the external data/control interface 190.

The add-on fixtures 165 may include one or more alignment fixtures that may be interchangeably attached to and/or guide the hand-size structured-light three-dimensional metrology imaging system 100 in conjunction with various mechanical interface features 195, described further below, to hold it at desired focusing distance and/or orientation relative to a workpiece 105, for improving the imaging and/or measurement results. Various alignment fixtures may include means for holding or guiding corresponding workpieces, to help establish a correct and/or repeatable orientation of a workpiece 105 relative to the metrology device. In some cases, an add-on fixture 165 may include or be integrated with a memory device that includes a code, or the like, that may facilitate recalling a particular set of measurement operations or program that is stored in the memory portion 180. Alternatively, a memory device of a respective add-on fixture 165 may include respective measurement operation or program instructions that correspond to the workpieces that are to be inspected using the add-on fixture, and the measurement operation or program instructions may be downloadable or executable under control of the signal processing and control unit 120 through the external data/control interface 190.

A calibration piece 170 (optional) may be supplied with the metrology system 100, and may comprise a carefully fabricated workpiece having known (x,y,z) dimensions. The calibration piece 170 may be used to calibrate or verify the magnification, pixel pitch, etc., of the metrology system 100.

As will be described in more detail below, in various embodiments, a reference object 115 may be an integral element used by the metrology system 100. The reference object 115 includes features that have a known relationship between their z- and y-coordinates and/or their x- and y-coordinates. Thus, when the reference object 115 is included in a laser illumination stripe along with the workpiece, it can be measured in z- and/or x-directions in the contour image for providing the y-axis coordinate associated with that contour image. Accordingly, the (x,y,z) information of all the contour images can be reassembled into an overall 3D surface map of a workpiece.

An (optional) voice recognition portion 135 may include a microphone and circuitry sufficient to receive and interpret various voice commands, and provide corresponding signals to the signal processing and control unit 120. In general, the voice recognition portion 135 may provide a redundant method, or the only method, for performing any of the control operations, selection operations, and the like, that may be required for operating the hand-size structured-light three-dimensional metrology imaging system 100, including various operations described in association with various manual and/or visual user control elements herein. The voice recognition portion may also provide sound or voice synthesis if desired, such that various action confirmations, mode confirmations, control actions alternatives, measurement results, and the like, may be provided by audio output to the user. The voice recognition portion 135 may also include a training and/or programming capability that allows the creation of custom commands and/or recognition that is customized for a particular individual. In one embodiment, the voice recognition portion 135 may be implemented using commercially available voice recognition circuitry, software, and/or development tools if desired, such as those associated with RSC-4X or SVC-64 series of IC's available from Sensory® Inc., Santa Clara, Calif., for example.

The memory portion 180 includes a storage medium that may be used to save various system configuration parameters and/or operating instructions or routines, as well as to save various measurement results and/or user-created measurement routines, if desired. The memory portion 180 may store the measurement information obtained from each of the contour images, and may also store the overall surface map information for a measured workpiece. It will be appreciated that surface maps or images taken may also be saved in the memory portion 180, with or without any associated screen overlays. Discrete surface maps or images of adjacent workpiece portions may be saved in the memory portion 180 and stitched together using known template-matching or image correlation technologies to register the discrete surface maps or images relative to one another, in order measure large features that cannot be contained in a single surface map or workpiece scan, if desired. In various exemplary embodiments the memory portion 180 may include ROM and/or RAM memory, and may be merged with, or indistinguishable from, the signal processing and control unit 120.

Figure 2:
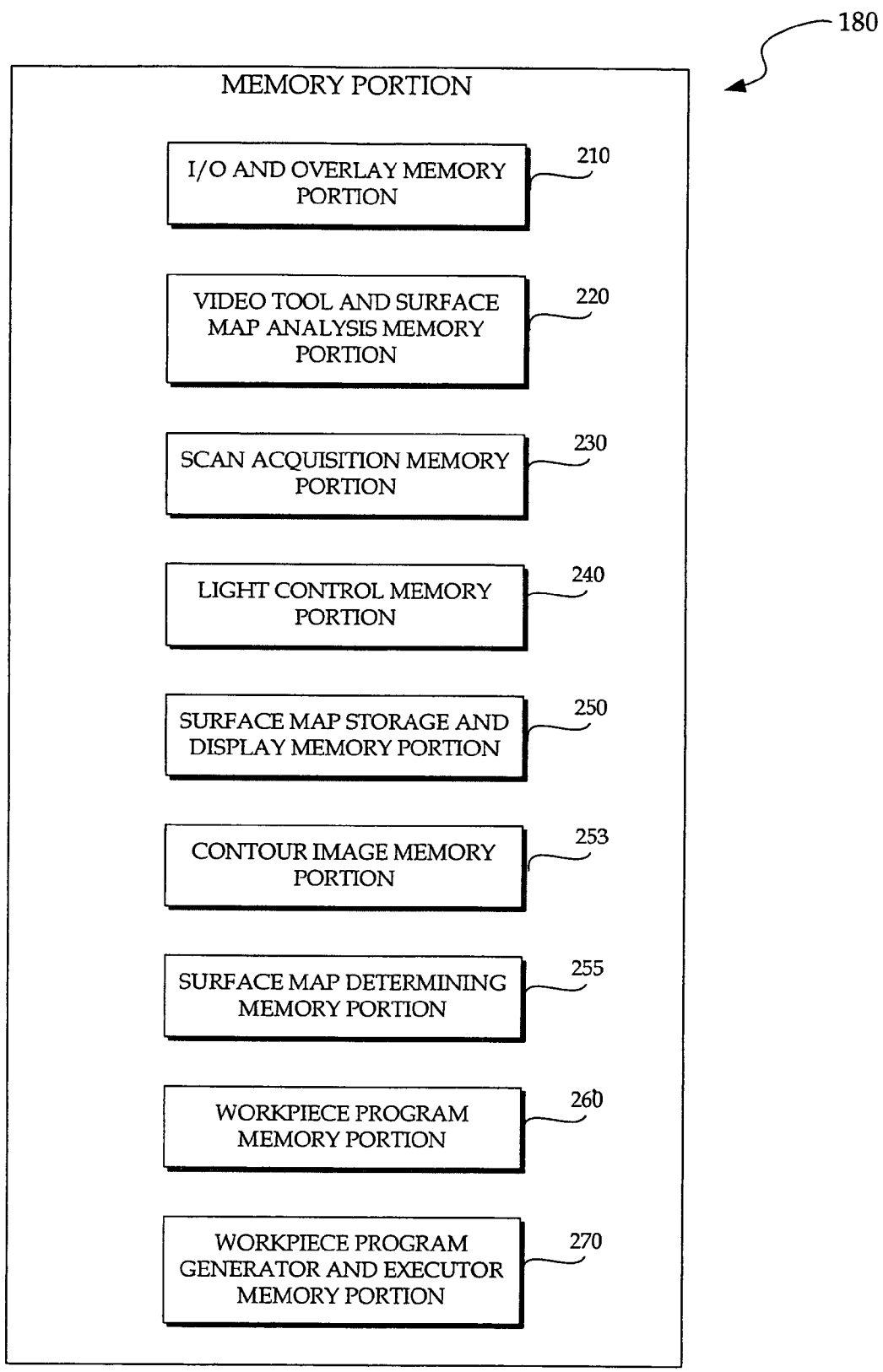
FIG. 2 is a block diagram of the memory portion of the structured-light three-dimensional metrology imaging system of FIG. 1.

FIG. 2 is a block diagram of one exemplary configuration usable for the memory portion 180 of FIG. 1. As shown in FIG. 2, the memory portion 180 includes an I/O and overlay memory portion 210, a video tool and surface map analysis memory portion 220, a scan acquisition memory portion 230, a light control memory portion 240, a surface map file memory portion 250, a contour image memory portion 253, a surface map determining memory portion 255, a workpiece program memory portion 260, and a workpiece program generator and executor memory portion 270. In general, each of these memory portions are interconnected to exchange information with the signal processing and control unit 120, which may input instructions, routines and/or data from the memory portions, perform processing, output data and signals to appropriate devices, and return data, state variables, etc., for storage in the memory portions. When the control unit 120 inputs these various instructions, routines and/or data from the memory portions and executes the corresponding operations, in effect, it provides the hand-size structured-light three-dimensional metrology imaging system 100 with an I/O and overlay determining portion, a video tool and surface map analysis portion, a scan acquisition portion, a light control portion, a surface map determining portion, and a workpiece program generator and executor portion, etc.

The I/O and overlay memory portion 210 may include instructions for processing various control signals and generating corresponding screen overlays that may be superimposed on displayed surface maps for output to a user. Manual workpiece surface map inspection and/or automatic workpiece surface map inspection may be accomplished, at least in part, by using "video tools". The video tool and surface map analysis memory portion 220 may include instructions governing the operation and display of various video tools that are used to analyze and inspect the features included in a surface map. Such tools may include, for example, dimension measuring tools, template or pattern matching tools, and the like. Some exemplary tools are described in greater detail below, with reference to FIGS. 11-14.

It should be appreciated that the video tools that are used on a surface map according to this invention perform operations similar or identical to the commercially and publicly available video tools and analysis routines used for inspecting and analyzing conventional images. Thus, such video tools and analysis routines may be used on properly formatted surface map data with little or no modification, as explained further below. Video tools similar to those used in a variety of commercially available machine vision inspection systems, such as the QUICK VISION® series of vision systems and the associated QVPAK® software for example, available from Mitutoyo America Corporation (MAC), located in Aurora, Ill., may be included in various embodiments. The features and operation of various video tools included in the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety, including their representation of the state of the art of such video tools. One example of an exemplary edge/boundary detection tool, and associated methods that may be used for various edge detection operations associated with various video tool components described further below, is disclosed in U.S. patent application Ser. No. 09/987,986, which is incorporated herein by reference in its entirety.

The scan acquisition memory portion 230 may include various parameters and/or routines or instructions usable in relation to acquiring a number of contour image images suitable for assembling into a surface map. For example, the scan operations of the blocks 610-660 of FIG. 10, described below, may correspond to instructions stored in the scan acquisition memory portion 230. In addition, image acquisition control parameters and signals such as the image frame acquisition frequency, exposure control (e.g., detector integration times and laser illumination power level), detector output timing and/or synchronization, and the like, may be governed by instructions and data stored in the scan acquisition memory portion 230. The light control memory portion 240 may include various parameters and/or instructions usable in relation to the lighting portion 150. For example, various parameters and/or routines usable for controlling the source of the laser illumination stripes, e.g., with regard to power, duty cycle, synchronization, etc., as well as various illumination-related power conservation routines, may be included. The contour image memory portion 253 may be used for storing the contour images provided according to instructions of the scan acquisition memory portion 230. The surface map determining memory portion 255 may include routines or instructions that govern the analysis of contour image data provided by the contour image memory portion 253, and the assembly of the corresponding workpiece surface map, and its storage by the surface map storage and display memory portion 250. The surface map storage and display memory portion 250 may be utilized for storing assembled surface map data, and for more conventional images of the workpiece, if any. It may also include routines or instructions that transform measurement information stored in the initial, most detailed, surface map, into one or more display versions of the surface map, and store such versions, and output them to the I/O and overlay memory portion 210 under control of the signal processing and control unit 120. For example, display versions of the surface map may have default and/or user-selected scaling and resolution in the x-, y, and z-directions, convert z-height information into colors for displaying a color-coded surface map, etc.

The workpiece program memory portion 260 may be used to store respective user-created operation sequences or programs that may be used to automatically analyze surface maps of respective types of workpieces. The operation sequences or programs may be saved with a unique identifying name or program address, and later recalled, for example, as outlined below with reference to FIGS. 15-18. The workpiece profile program generator and executor memory portion 270 may include various instructions and/or routines that may be used for creating, saving, recalling, and executing such operation sequences or programs.

Figure 3:
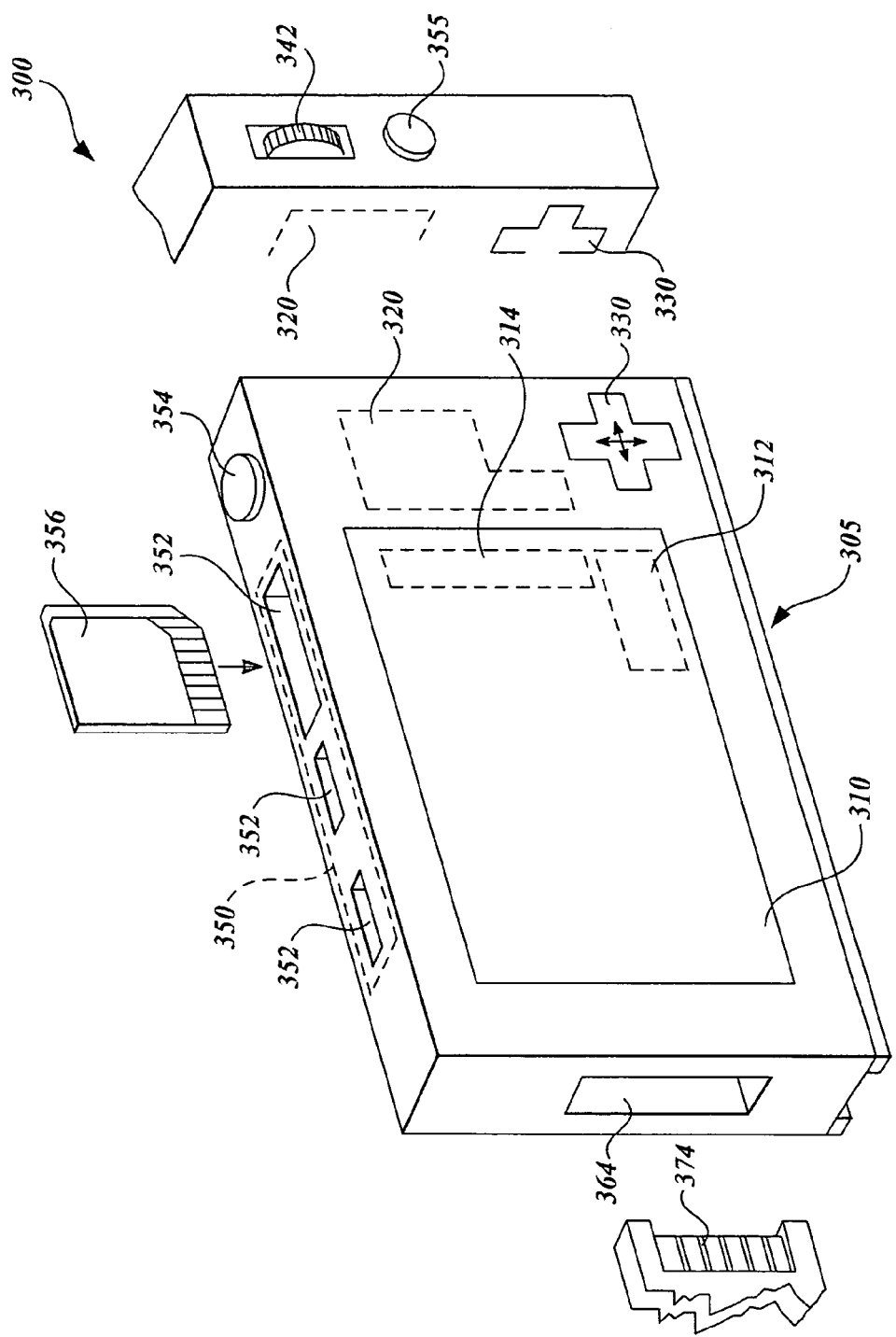
FIG. 3 is an isometric diagram of a first exemplary embodiment of control panel and display portions of a first exemplary embodiment of an electronic portion of a hand-size structured-light three-dimensional metrology imaging device in accordance with the present invention.

FIG. 3 is an isometric diagram illustrating a first exemplary embodiment of a control panel and display portion 305 of a first exemplary embodiment of an electronic portion 300 that may be included in a hand-size structured-light three-dimensional metrology imaging device. As shown in FIG. 3, the control and display portion 305 includes a display region 310, a control button region 320, a cursor control 330, a thumbwheel 342, a lighting button 355 (optional), and a scan acquisition ("start/stop") button 354. Similar control panel and display portions are described in co-pending and commonly assigned U.S. patent application Ser. No. 11/096,497, filed Mar. 29, 2005, which is hereby incorporated by reference in its entirety.

The display region 310 may include a main area used for displaying a surface map, measurement result region 312 and an adaptive icon/label region 314. The control button region 320 and the associated adaptive icon/label region 314, cursor control 330, thumbwheel 342 and scan acquisition button 354, comprise controls which a user may utilize to acquire workpiece scans and obtain measurements, as will be described in more detail below. The thumbwheel 342 (or a slider, or pressure-sensitive miniature "joystick" or thumb stick, or the like) may provide for rapid scrolling of a selector along a menu or list, or movement of a cursor or other indicator or tool portion across the display region 310 screen, or to scroll a display surface map, or to adjust a light source intensity or other parameters. The electronic portion 300 may also include a connector port 364 for receiving a mating connector 374 that provides power and signal connections to and from the imaging electronics 112 (see FIG. 1) and a laser light source (described further below), and an accessory connector region 350. The accessory connector region 350 is optional, and may include one or more external data interfaces/connectors 352 and may receive various removable memory cards 356 that connect for receiving and/or providing stored surface maps, workpiece inspection operation instructions or routines, and the like.

In various embodiments, the electronic portion 300 may comprise a commercially-available personal digital assistant (PDA), or an analogous electronic unit having a customized housing and control elements, or a fully customized electronic unit, or the like. However, such a configuration is exemplary only, and not limiting.

Figure 4:
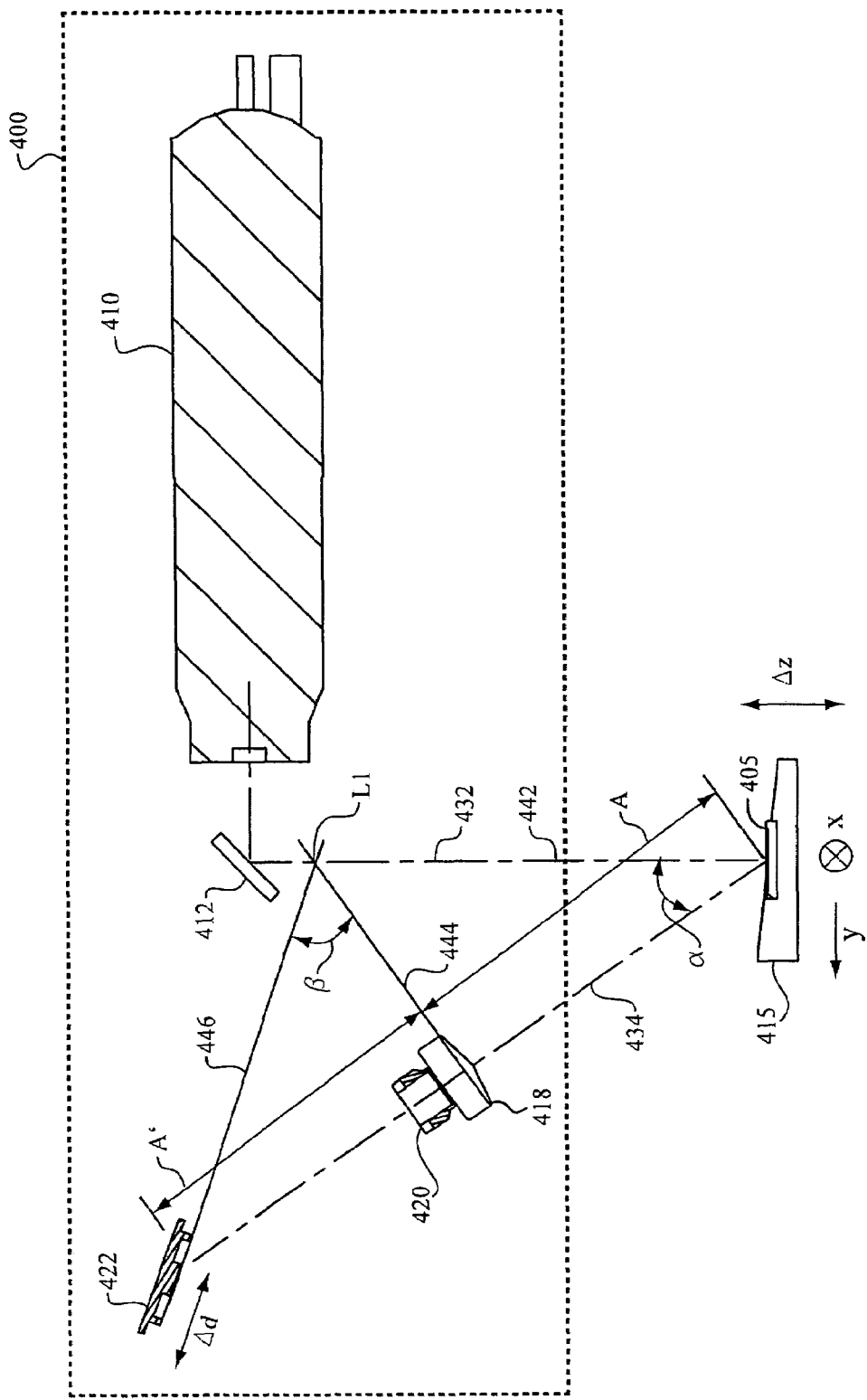
FIG. 4 is a diagram illustrating an exemplary operating configuration for a structured-light three-dimensional metrology imaging system in accordance with the present invention.

FIG. 4 is a diagram illustrating an exemplary operating configuration for a structured light three-dimensional metrology imaging system 400 using a laser source 410 in accordance with the present invention. The laser source 410 includes beam-shaping optics to form a stripe. Alternatively, the laser source 410 may include a means to deflect a laser spot repeatedly at high speed, such that it appears as a stripe. Alternatively, an LED source or a compact xenon strobe source may be used along with proper beam-shaping optics, to form a stripe usable in place of the laser stripe described herein. As shown in FIG. 4, a shaped beam from the laser source 410 is reflected by a mirror 412 and travels as a shaped beam 432 to provide a laser illumination stripe on a workpiece 405. As will be described in more detail below, the workpiece 405 may be located next to a reference object 415 that is also receives the laser illumination stripe. In one embodiment the reference object 415 is formed as a ramp. A portion of the light from the laser illumination stripe is reflected from the surface of the workpiece 405 and reference object 415 as image light 434, which travels from the workpiece and reference objects 405 and 415 through a lens 418 and an aperture 420 to a detector/image sensor 422. For purposes of description, the convention used herein for the coordinate axes of the (x,y,z) measurements determined by the system of FIG. 4 is that the y-axis runs horizontally in FIG. 4 and the z-axis runs vertically, both in the plane of the page. The x-axis is perpendicular to the y- and z-axes, running in and out of the page. Nominally, the shaped beam 432 (the laser illumination stripe) is aligned parallel to the x-z plane, pixel rows of the image sensor 422 are aligned parallel to the x-axis, and the scan direction is parallel to the y-z plane (and preferably parallel to the y-axis). The heights of features on the measurement and reference objects 405 and 415 are measured along the z-axis.

As will be described in more detail below, during a workpiece scan, the laser illumination stripe from the laser source 410 is provided across the measurement and reference objects 405 and 415 in the x-z plane. Light from the illuminated stripe on the workpiece propagates along the optical axis, and is captured by the image sensor 422 as a "current" contour image, and stored in memory. Subsequently, the metrology system 400 is displaced slightly along the y-axis direction (avoiding motions other than translation along the y-axis), the laser illumination stripe is provided at a slightly displaced location on the workpiece, and a new current contour image is captured by the image sensor 422, and stored in memory, and so on. In another embodiment, if the signal processing and control unit 120 is sufficiently fast, the contour image data need not be stored in permanent memory. Rather, the contour image data may be analyzed to determine the corresponding (x,y,z) coordinates of the workpiece surface, in real-time, and the (x,y,z) coordinates may be stored. This may allow the memory size to be reduced relative to the previous embodiment, and may also allow a surface map to be determined, displayed, and extended, in real-time. In either case, the scan process may be continued for any desired scan length (y-displacement), up to a maximum limit, to provide a series of contour images corresponding to the surface region that is to be measured. The scan length limit may depend on the maximum amount of contour image data that can be stored in memory, or on the length of a reference object along the y-axis, which may determine the maximum length over which a y-axis coordinate determining technique may be used, as described in greater detail below.

How the contour images provide accurate z-height measurement information for the workpiece, is explained as follows: Since the optical axis of the imaging system is angled relative to the x-z plane, the various z-axis displacements of the surface features of the workpiece 405 that fall within the laser illumination stripe will produce a contour image on the image sensor 422 that includes corresponding displacements. In other words, if the workpiece 405 was flat, the corresponding contour image would appear to be completely straight at the image sensor 422, whereas a raised ridge in the middle of the workpiece 405 would cause the contour image to have a corresponding displacement in the middle, wherein the displacement is indicative of the z-height of the raised ridge. The displacement in the contour image at the image sensor 422 can be converted to a z-height measurement by applying trigonometric principles. More specifically, the following equation provides a means for determining a z-height "z" at a point along the laser illumination stripe on the surface of the workpiece 405, based on a displacement "d" at the corresponding point along the contour image:

$$z = \frac{d * A\cos(\beta)}{A'\sin\alpha - d * \cos(\alpha - \beta)} \quad \text{(Eq. 1)}$$

This equation is valid when the reference for z=0 is where the optical axis intersects with the x-z plane, and the reference for d=0 is where the optical axis intersects with the image sensor 422. As shown in FIG. 4, the object distance A is the distance along the optical axis between the x-z plane and the lens principle plane 444, the image distance A' is the distance along the optical axis between the image sensor 422 and the lens principle plane 444, the angle α is between the x-z plane (the plane of the laser illumination stripe) and the optical axis of the imaging lens, and the angle β is between the lens principle plane 444 and the image sensor plane 446.

The configuration shown in FIG. 4, and underlying EQUATION 1, is a configuration known as a Scheimpflug configuration, which provides for accurate focus of the contour images even though the object plane 442 (the x-z plane) and the image sensor plane 446 are tilted with respect to the optical axis. More specifically, the precondition posted by Theodore Scheimpflug in 1904 states that the object-plane 442 is imaged sharply in the image plane 446, if the object plane 442, image plane 446, and lens plane 444 intersect in the same line. In the configuration of FIG. 4, the object plane 442, lens plane 444, and image sensor plane 446 intersect in the line L1. Sharp focus of the contour image on the image sensor 422 is important in the metrology system 100, in which accuracy on the order of 5-10 microns is desired at low magnification. With sharp focus, displacements in the contour images may be more accurately determined (including sub-pixel determination of the center of the contour image line, in some embodiments), resulting in more accurate and repeatable z-height measurements of the surfaces of the workpiece and reference objects 405 and 415.

How the measurement information from a series of contour images captured during a workpiece scan can be assembled to provide an accurate 3D surface map is explained as follows: The image sensor 422 comprises rows and columns of pixels. According to the convention used herein, the image sensor is aligned such that the rows are aligned parallel to the x-axis. We may define an (x', d) image sensor coordinate system: The coordinate along the direction of the pixel rows is designated x', and the coordinate along the direction of the pixel columns is d, as previously described with reference to EQUATION 1. The y-z plane may be conveniently taken to coincide with the optical axis, since a point along the laser illumination stripe in this plane is imaged onto the contour image line in this same plane, that is, in this plane x'=x=0. For the configuration shown in FIG. 4, other points corresponding points along the laser illumination stripe and the contour image line have coordinates that are linearly related, that is, kx'=x, where k depends on the optical system magnification. Thus, a point along the contour image line that has coordinates (x',d) indicates that there is a corresponding point on the workpiece surface that has the coordinates (x,z), which may be determined according to the previously described relationships. However a reference is still needed for determining the y-coordinate corresponding to each contour image.

Desktop-size, and larger, scanning systems typically include a motion control system and/or a position sensor for determining a scan coordinate. Alternatively, the motion control system can scan at a known speed, such that image acquisition timing information provides an indication of the scan coordinate. However, the present system is intended as an economical, portable, hand-size instrument, thus, such bulky or complicated components are eliminated in preferred embodiments according to this invention. Instead, the user is responsible for moving the device over the workpiece at a speed slow enough for obtaining a series of closely spaced contour images. Thus, a different technique for determining the relative y-coordinate corresponding to each contour image is needed. In one embodiment, a y-coordinate determining technique may be used that does not require any additional sensors. Instead, a reference object (e.g., a ramp) may be used as outlined below.

FIG. 4 is illustrated as utilizing a reference object configuration in which the reference object 415 is a ramp placed next to (behind) the workpiece 405, such that it is included in the laser illumination stripe and the contour image. Such a contour image is described in more detail below with reference to FIG. 5. Such a contour image may be used to determine both the z-heights of raised features on the workpiece 405 and the "current" z-height of the reference object 415, that is, the height of the reference object 415 at the y-coordinate of the corresponding laser illumination stripe on the workpiece. Given the slope (angle) of the surface of the reference object 415 relative to the x-y plane, the current z-height of the reference object 415 may provide the current y-coordinate to be associated with the current laser illumination stripe and contour image, according to a trigonometric relationship. It will be appreciated that it is the relative y-coordinate of each laser illumination stripe (and contour image) relative to the others that is important for constructing an accurate surface map. An arbitrary y-coordinate offset may be associated with y-coordinates determined based on the reference object 415, if desired. Utilizing the techniques outlined above, the (x,y,z) measurements of all scanned surface points included in a series of contour images can be determined, and a 3-D surface map assembled based on that information.

In an alternative y-axis coordinate determining technique, a light source portion of the metrology system 100 may include a separate conventional-imaging illumination portion, such as an LED strobe source or the like, which may be used in addition to the laser illumination stripe source. In this technique, in conjunction with each contour image, a conventional image is acquired. For example, both the contour image and the conventional image may be acquired by strobing the two light sources in rapid succession and capturing images corresponding to each, in the shortest time possible. Using known image correlation techniques, the displacement of the conventional workpiece image across the image sensor 422, between two images, may be determined with sub-pixel accuracy. The displacement in pixels may be converted to a relative y-coordinate displacement based on the known optical geometry, pixel spacing, and magnification. There is a potential for poor focus at the periphery of the conventional images due to the workpiece surface not conforming to the focal plane of the Scheimpflug configuration. However, because the desired and expected displacement between successive contour images is very small, as described elsewhere herein, sufficiently accurate image correlation may still be facilitated within a reasonably focused region in the middle of each field of view. Relative y-coordinate changes between contour images may be determined by interpolating between the relative y-coordinate changes of a set of correlated conventional images, if necessary.

Figure 5:
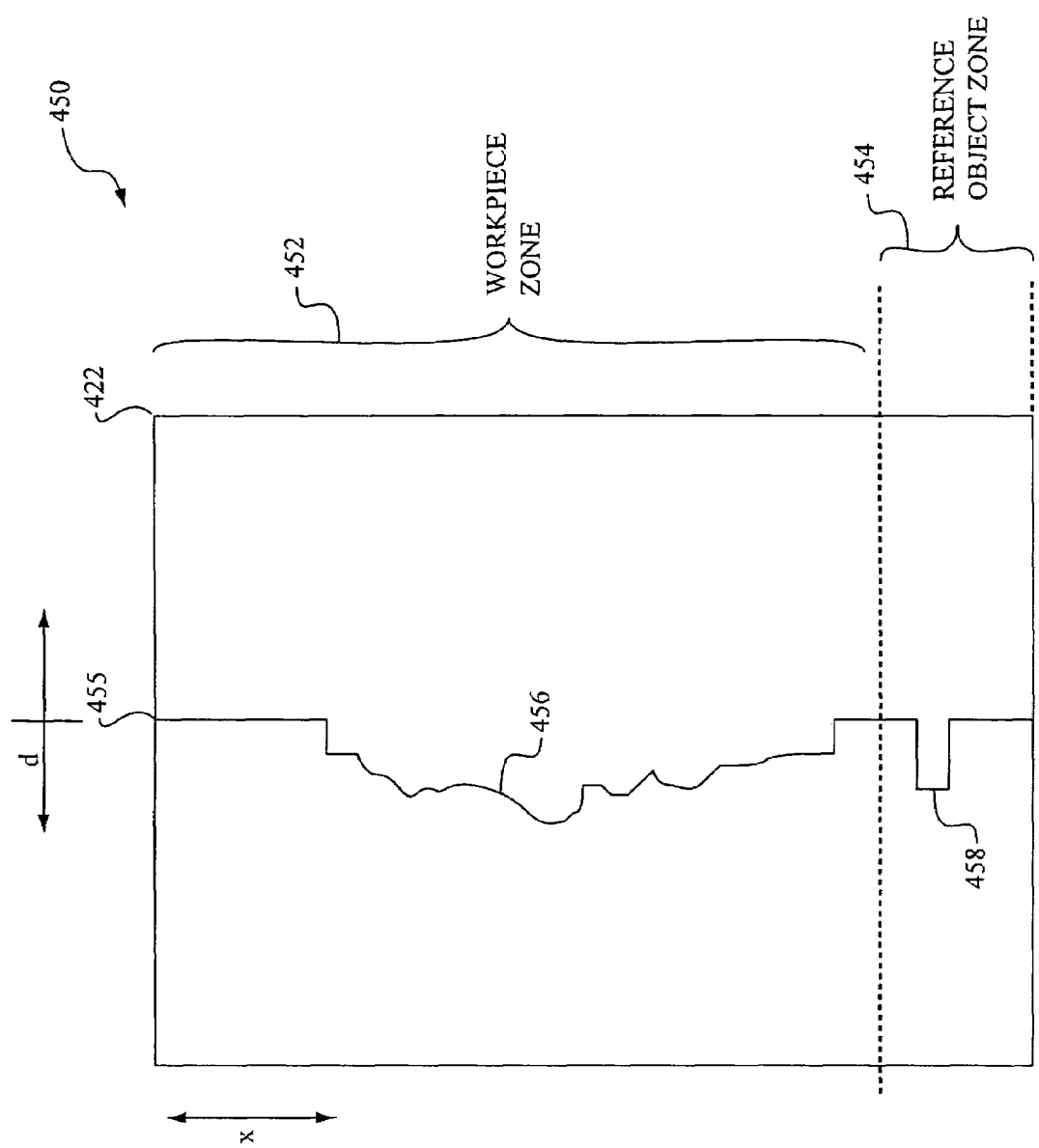
FIG. 5 is a graph illustrating a contour image output of the system of FIG. 4.

FIG. 5 is a diagram 450 schematically illustrating the features of a contour image on the image sensor 422 of the system of FIG. 4. As shown in FIG. 5, the diagram 450 includes a workpiece zone 452 and reference object zone 454. A contour image 455, arising from a workpiece as outlined above, is shown across the image sensor 422, including a workpiece portion 456 in the workpiece zone 452, and a reference object portion 458 in the reference object zone 454. In one embodiment, the dividing line between the workpiece zone 452 and the reference object zone 454 may be determined by design, and the user may be trained to set the reference object 415 in the proper position under the metrology system, at the proper distance from the end of the laser illumination line, for example. The reference object may include a feature beside the ramp that aligns with the end of the laser illumination line to aid the user, if desired.

In another embodiment, the reference object 415 may simply have a planar ramp surface with a known x-width. Since the user can visually insure that a workpiece to be measured includes no comparable features, the metrology system 400 can simply analyze the contour image to locate the portion corresponding to the known x-width of the reference object 415, in order to distinguish it from the workpiece. In such a case, the workpiece zone 452 and the reference object zone 454 need not be predetermined.

As illustrated, the workpiece portion 456 includes sections that are offset by displacements d, which as described above are indicative of the z-height of the surface of the workpiece 405 (as calculated by EQUATION 1). As also described above, the displacement d of the reference object portion 458 is indicative of the current z-height of the reference object 415, which can be used to determine an accurate relative y-coordinate corresponding to the current contour image 455, given the known angle of the ramp of the reference object 415 relative to the x-y plane, as outlined above. Once the relative y-axis positions associated with each of the contour images are determined, the information from each of the contour images can be accurately recombined to produce a complete 3D surface map for the measured surface of the workpiece 405.

Figure 6:
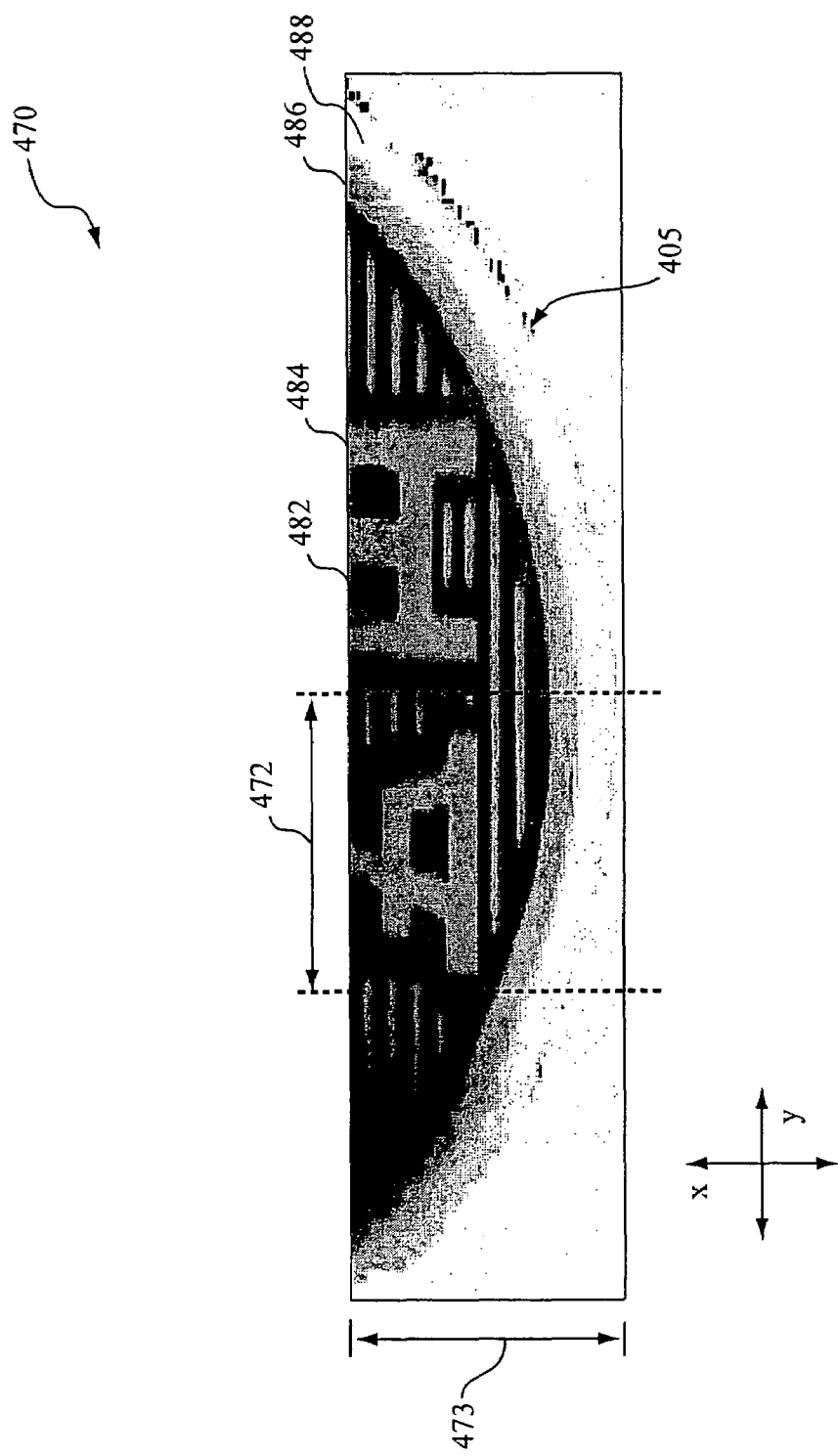
FIG. 6 is a diagram of a surface map of a measured object utilizing the system of FIG. 4.

FIG. 6 is a diagram of a surface map display 470 obtained using the metrology system configuration of FIG. 4, in which the workpiece 405 is the edge of one side of a coin. In the surface map display 470, higher and lower z-height ranges on the surface of the workpiece 405 are indicated with different levels of gray-scale in the figure, but may generally be displayed in color in an actual metrology system, for better readability and/or to increase the number of distinguishable ranges in order to provide more z-resolution on the display, if desired. More specifically, in FIG. 6 features 482, 484, 486, and 488 are shown to be different shades of gray-scale, which are indicative of different z-height ranges for the various features, with the darker portions generally indicative of relatively lower features, whereas the lighter portions are indicative of relatively higher features.

The actual length a workpiece scan along the y-axis may be any desired length, up to a maximum limit, as previously described. The actual width of the workpiece scan along x-axis direction is generally limited by the magnification used in combination with the dimension of the image sensor along the x-axis. The surface map data underlying the surface map display 470 may generally reflect the scan length and width, and may be digitally magnified when it is output on the metrology system display as the surface map display 470, such that it exceeds the size of the display, at least along the y-axis of the surface map. In one embodiment the digital magnification is selected such that the width 473 of the surface map display 470 fills, or nearly fills, the display 310 of the electronic portion 300 (see FIG. 3.) Thus, a region 472 of the surface map display 470 schematically indicates the portion of the surface map display 470 that may actually be shown on the display 310 of the electronic portion 300 at one time, when digitally magnified. The magnified version of the surface map display 470 may be scrolled to display any desired portion, using a scrolling control method provided by the control panel and display portions 305 of the electronic portion 300.

It should be appreciated that the actual surface map used to generate the surface map display 470 may be determined from all the (x,y,z) measurement data derived from a workpiece scan. Therefore, the actual surface map may have far greater measurement resolution than can be practically indicated in the surface map display 470. Therefore, in various embodiments, when measurements are defined and performed using video tools on the surface map display 470, the underlying data of the actual surface map that corresponds to the defined measurement locations may be used to provide the best possible measurement results.

In various embodiments, it may be convenient to use video tools developed for use with conventional images in the metrology system. In such a case, such tools may be used with little or no modification if the surface map data is properly formatted. Along the x-axis direction, the data is generated from the contour images with a regular pixel spacing, and needs no modification. Along the y-axis, the spacing between the original contour images is not required to be a regular spacing during a workpiece scan, although it may be on the order of the x-axis pixel pitch. Therefore, if necessary for compatibility with certain video tools, the raw z-heights from the scan data may be interpolated along the y-axis direction in a region of interest, to provide interpolated z-height data at a compatible spacing along the y-axis. Along the z-axis, conventional video tools may assume that data will be in the form of intensity data, such as an 8-bit gray-scale range. Therefore, if necessary for compatibility with certain video tools, the raw z-heights in a region of interest may be normalized and/or offset into a compatible range, processed by the video tools, and the results transformed back, if the output needs to be in the original z-height units.

Figure 7:
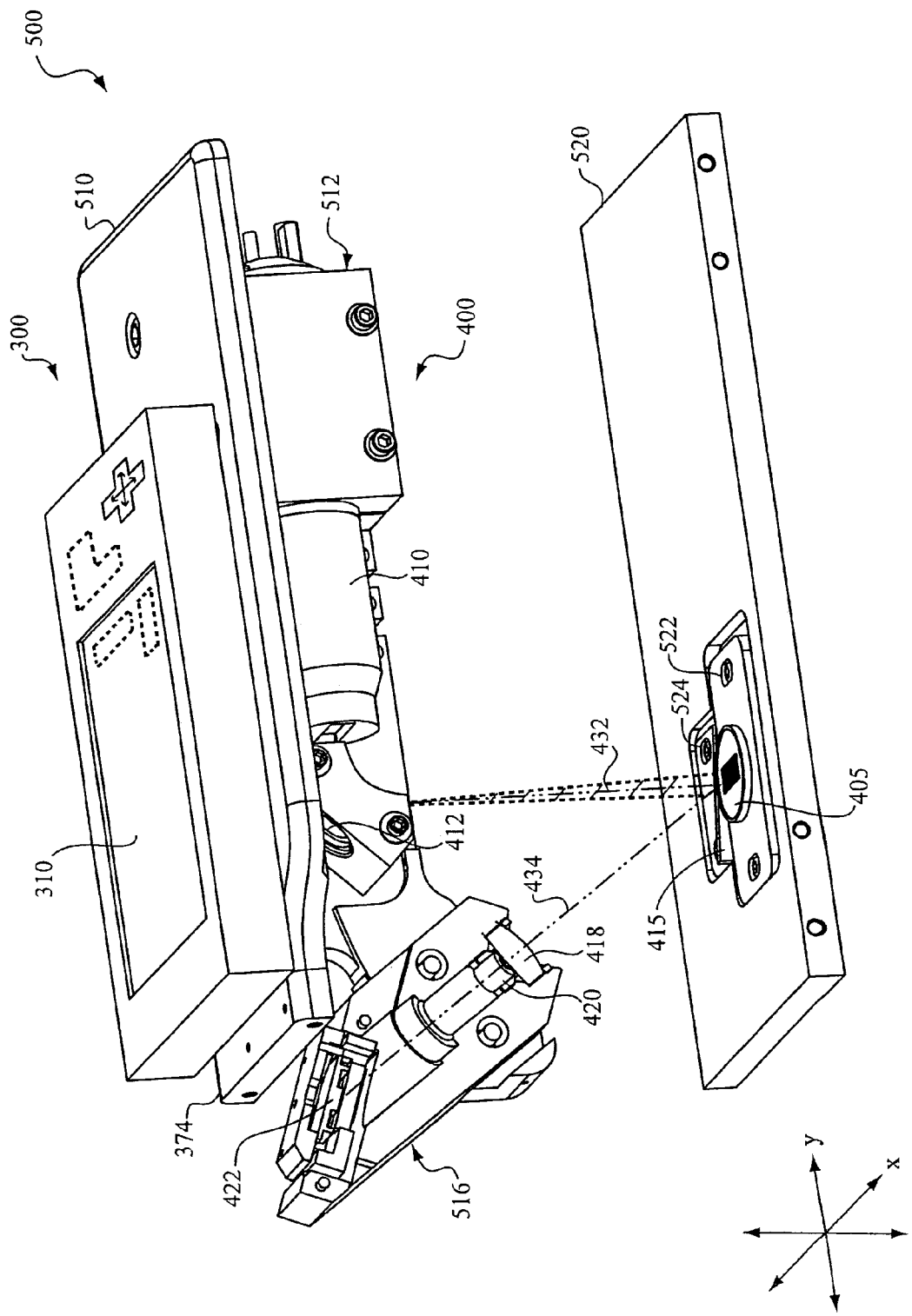
FIG. 7 is an isometric diagram of an exemplary embodiment of a hand-size structured-light three-dimensional metrology imaging device implementing the configuration of FIG. 4 and the display and control portions of FIG. 3

FIG. 7 is an isometric diagram of an exemplary embodiment of a hand-size structured-light three-dimensional metrology imaging device 500 (the device 500) in which the electronic portion 300 of FIG. 3 is utilized in conjunction with the metrology system 400 of FIG. 4. As shown in FIG. 7, the device 500 includes a mounting plate 510. The mounting plate 510 carries the electronic portion 300 and an implementation of the metrology system 400. The electronic portion 300 includes the display 310 and connects to the connector portion 374 as previously described (see FIG. 3.) The metrology system 400 includes the laser source 410, the mirror 412, the lens 418, the aperture 420, and the image sensor 422. The mounting plate 510 also carries various component holding portions, including laser holder 512 for the laser source 410, and an optical assembly holder 516 for holding the lens 418, aperture 420 and image sensor 422. During operation of the device 500, the metrology system 400 operates as described above with reference to FIG. 4, where similar elements are numbered similarly. The hand-size structured-light three-dimensional metrology imaging device 500 may be provided in a volume at least as small as 120 cubic inches, if desired.

The mounting plate 510 may include various mechanical interface features, such as guiding or alignment features positioned and/or fixture mounting holes, and the like, on any desired surface. Guiding or alignment features, which may comprise pins, balls, grooves, rods, miniature linear bearings, or the like, may be positioned to sit or slide on an add-on fixture alignment feature, for example as described below with reference to FIG. 8, in order to assist in positioning the device 500 in at a stable manner at a desired height and orientation relative to a workpiece, and to assist in guiding it along the y-axis during a workpiece scan. It should be appreciated that such considerations may be quite important when the device 500 is used to perform relatively high precision metrology for small or microscopic features, and/or use magnifying lenses that may have short working distances and/or a small depth of focus.

A workpiece fixture 520 is also shown in FIG. 7. It includes a workpiece holder 522 on which the workpiece 405 is placed, as well as a reference object holder 524 for the reference object 415, and generally establishes the top of the workpiece 405 and the bottom of the reference object 415 sufficiently parallel to an x-y measurement plane, to support measuring operations according to previously outlined measurement principles. It will be understood that the workpiece fixture 520 is attached to the mounting plate 510, as shown and described below with reference to FIG. 8. The attachments are omitted in FIG. 7, to more clearly illustrate other elements.

Figure 8:
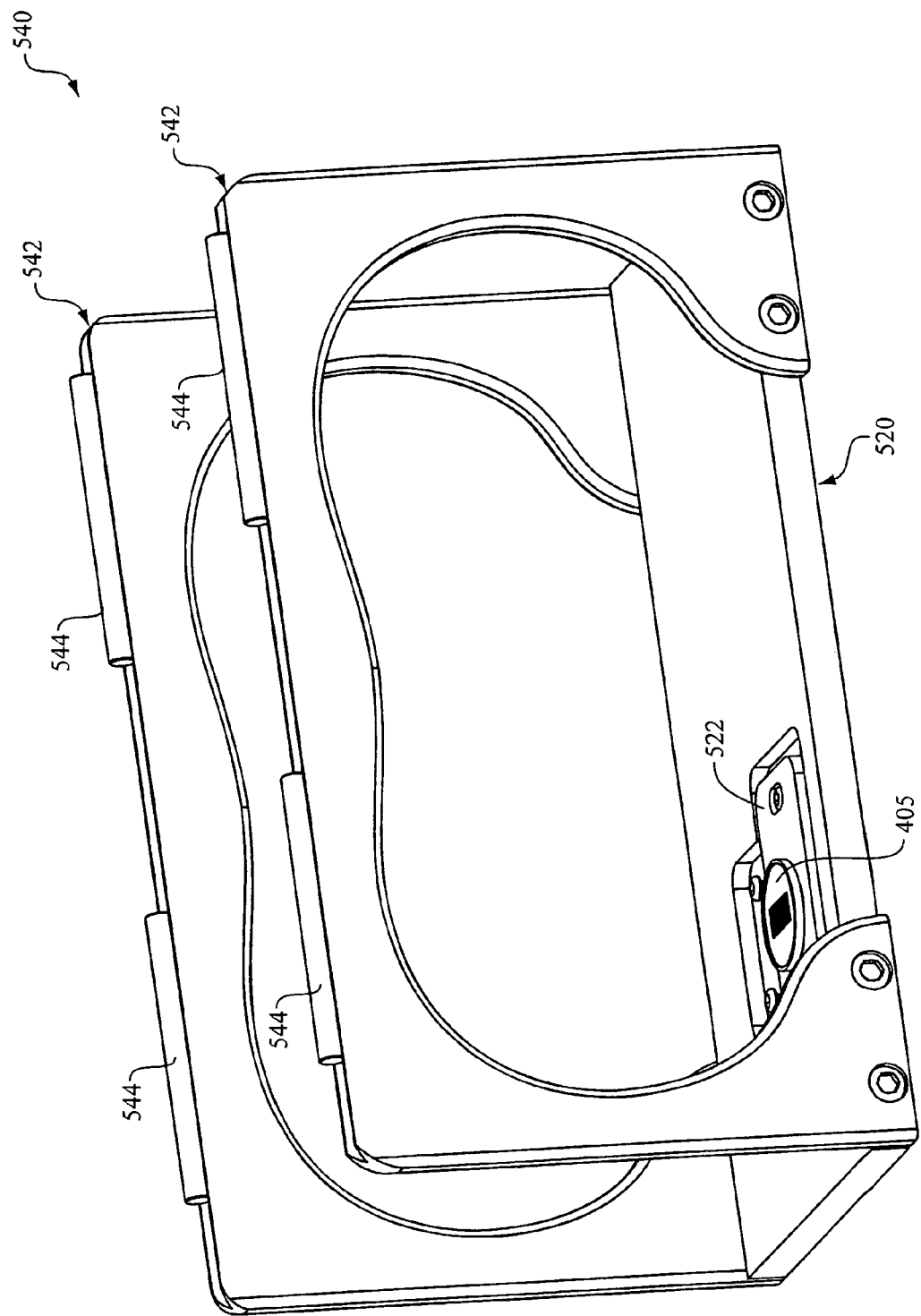
FIG. 8 is an isometric diagram of a first exemplary alignment fixture usable in conjunction with the hand-size structured-light three-dimensional metrology imaging device of FIG. 7.

FIG. 8 is an isometric diagram of a first exemplary alignment fixture 540 usable in conjunction with the hand-size structured-light three-dimensional metrology imaging device 500 of FIG. 7. As shown in FIG. 8, the alignment fixture 540 includes side plates 542 that are mounted to the workpiece fixture 520. The side plates 542 include low friction sliding guides 544, which define the y-axis direction in this case, and engage v-grooves (not shown) on the mounting plate 510 of the device 500. The alignment fixture 540 is designed to position the device 500 at the desired operating height above the workpiece 405, nominally parallel to the x-y measuring plane and properly aligned along the y-axis such that the user may slide it smoothly along the sliding guides 544 to perform a workpiece scan.

Regarding workpiece scanning, in one example where a scanned length of 10 mm is utilized, the user is assumed to move the device at an average velocity of approximately 2 mm per second and a scan time of approximately 5 seconds is utilized. In this example, a CMOS camera is utilized for the image sensor 422, which digitizes and outputs a full 1280× 1024 pixel image at a frame rate of approximately 10 frames per second (although far fewer rows of pixels are typically utilized for the contour image displacements perpendicular to the x-axis in the image sensor 422.) Therefore, a frame (a contour image) is acquired approximately each 200 microns along the scan. Strobe illumination may be used to prevent smearing of the contour images along the scan direction.

It will be appreciated that if the average scan velocity is reduced, or the frame rate increased, the frames will be separated by a shorter distance, thus providing better resolution along the y-axis direction. For pixels rows spaced at 10 microns perpendicular to the x'-axis, when the z-height range is limited to about 2.5 mm and the magnification is 1:1, only approximately 250 rows of pixels include contour image displacement data. By outputting less image data (conservatively, 400 rows, for example), higher frames rates can be achieved than in the previous example. Thus, in one embodiment, it may be practical and desirable to have the frames separated by approximately the same distance along the y-axis as the distance between pixels in the image sensor 422, e.g., approximately 5-10 microns.

In one exemplary operating procedure for performing a workpiece scan, the user positions the device 500 as desired relative to the workpiece, for example by viewing the position of the laser illumination stripe, which may be visible, relative to the workpiece (and reference object.) The user them presses the scan acquisition button 354 (see FIG. 3) and begins sliding the device 500 forward along the y-axis at a desired speed. Scan images are acquired as previously outlined. When the user reaches the end of a desired scan range, as determined by viewing the position of the laser illumination stripe, for example, the user again presses the scan acquisition button 354 to end the scan. The device 500 may then automatically determine and store the surface map data corresponding to the scan, determine a display version of the surface map, and output the display version to the display, as previously described.

Figure 9:
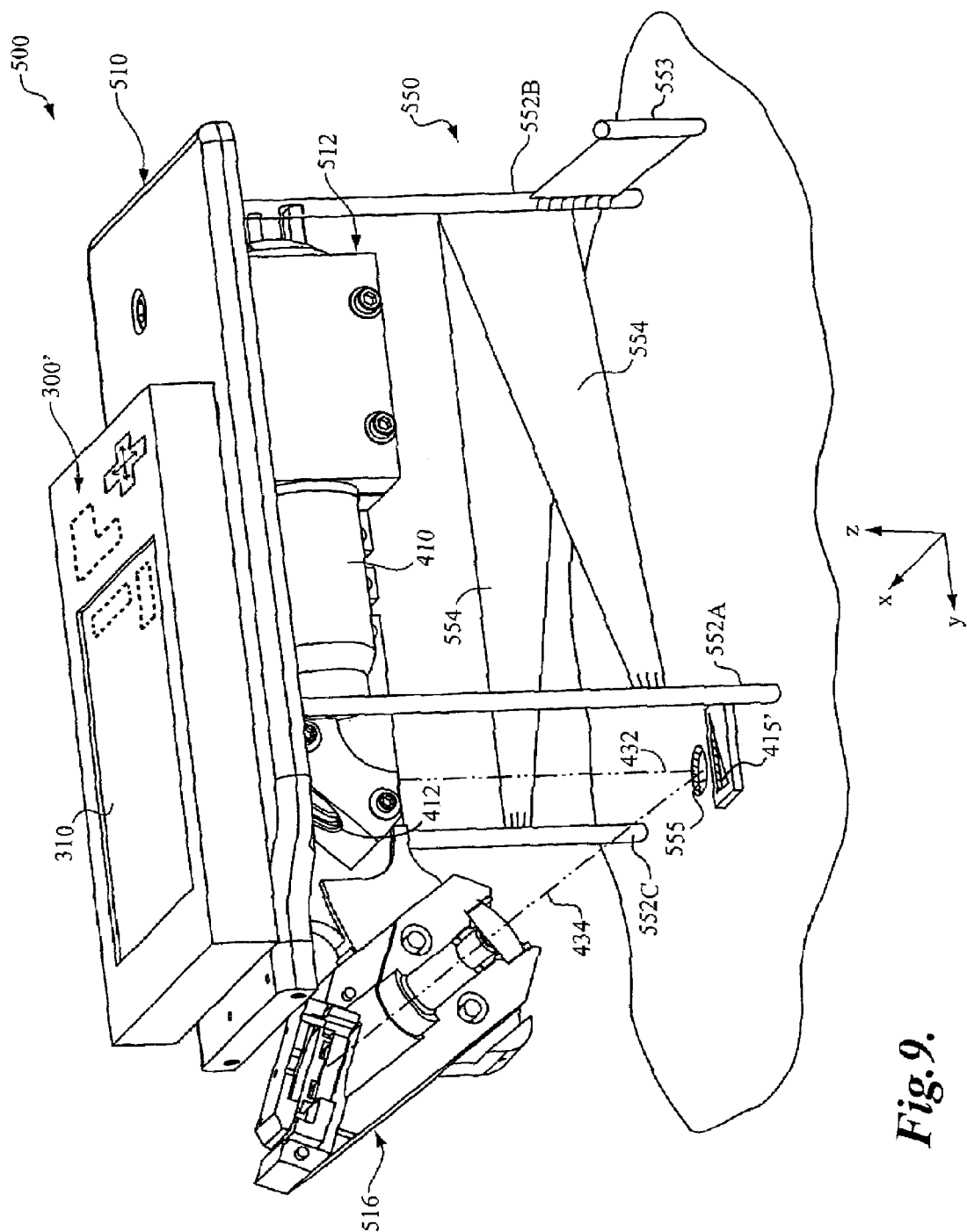
FIG. 9 is an isometric diagram of a second exemplary alignment fixture usable in conjunction with the hand-size structured-light three-dimensional metrology imaging device of FIG. 7.

FIG. 9 is an isometric diagram of a second exemplary alignment fixture 550 usable in conjunction with the hand-size structured-light three-dimensional metrology imaging device 500 of FIG. 7. As shown in FIG. 9, the alignment fixture 550 comprises a frame that includes support posts 552A-552C and bracing portions 554, which are rigidly attached to the mounting plate 510, and an alignment extension 553, described further below. The alignment fixture 550 positions the device 500 at the desired operating height relative the surface relative to a workpiece, and nominally parallel to the surface that it rests on. It is particularly useful in conjunction with measuring features on large surfaces of objects (e.g., rivets or screws in a large surface such as that of an airplane). In this regard, rather than providing a workpiece fixture 520, the alignment fixture 550 is placed on top of the surface having the feature to be measured. A feature to be scanned will be referred to as a workpiece, continuing the previous convention. In this case, the workpiece 555 consists of a rivet or screw in a surface (e.g., on the surface of an airplane). For the workpiece 555, the previously described ramp-type reference object 415 may not be suitable. Therefore, a relatively planar reference object 415', described further below, is temporarily fixed next to the workpiece 555, to fall within the scan (e.g., utilizing a magnetic backing, temporary adhesive, a stable putty, or other means for holding the reference object 415' in place). In one embodiment, a thin layer of stable putty may be used under the reference object 415', and a jig (not shown) may be used to push the reference object 415' into the putty and insure that it is approximately parallel to the x-y plane, e.g., the surface surrounding the workpiece 555.

In the example of FIG. 9, the reference object 415' is orientated such that rather than providing a y-coordinate reference as a function of z-height information, a thin raised portion, or shallow depression, in the shape of a narrow triangle extending along the y-axis direction, provides y-coordinate reference as a function of its known angle and its width along the x-axis in each contour image of a scan. The use of the reference object 415' is analogous to that previously described for the reference object 415, and need not be described further.

It should be appreciated that, if it is desired to perform a scan down the middle of a wider workpiece, the reference object 415' may be made sufficiently thin to be positioned directly on the workpiece, so that it may appear in the scan. In a different embodiment, instead of the triangle of the reference object 415', the reference object is wider and is fabricated with a trapezoidal through-hole. The axis of symmetry of the trapezoid is positioned parallel to the y-axis, and the trapezoid has a width such that its angled sides may appear at opposite ends of a contour image. The workpiece may be scanned through the trapezoid, and the width of the trapezoid in a contour image and the known angles of its sides may be used in a manner analogous to the triangle of the reference object 415', to provide a y-coordinate for that contour image. Additional reference object designs will be described below, with reference to FIGS. 19A-19C.

The alignment extension 553 support post 552A are aligned parallel to the y-z plane (the direction perpendicular to the laser illumination stripe) which facilitates moving the device 500 along a consistent direction with consistent alignment, as follows. First the user may position the device 500 at a desired position and orientation (about an axis perpendicular to the surface) relative to the workpiece 555, for example by viewing the position of the laser illumination stripe, which may be visible. Then, holding the alignment fixture 550 at that position, a temporary guide rail (not shown) may be positioned against the alignment extension 553 and support post 552A, and temporarily fixed to the surface by any convenient means. When performing a subsequent scan, the user may then gently hold the extension 553 and support post 552A against the guide rail, to provide stable alignment while performing the scan.

Figure 10:
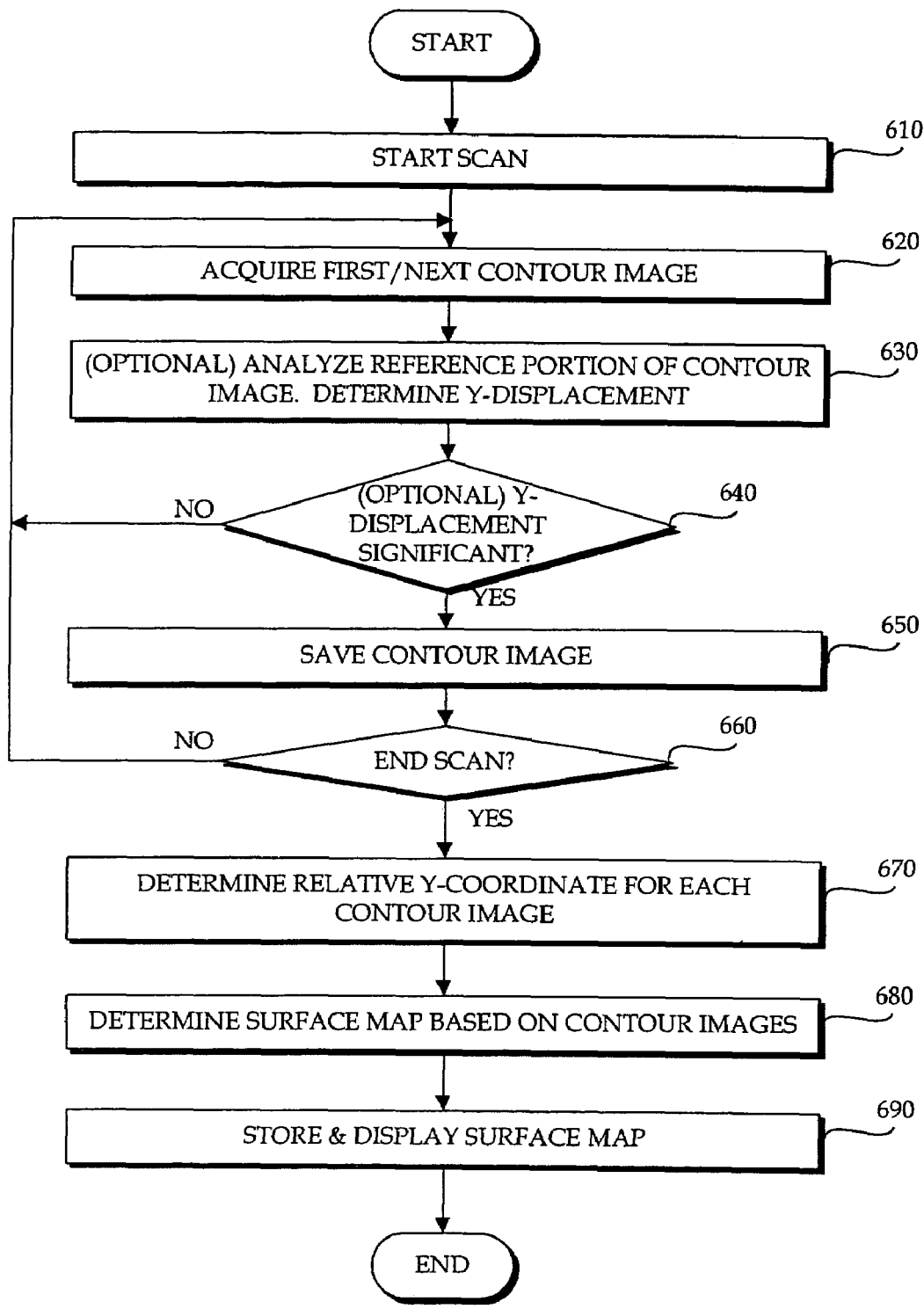
FIG. 10 is a flow diagram illustrative of one exemplary routine for a scan operation of a hand-size structured-light three-dimensional metrology imaging device.

FIG. 10 is a flow diagram 600 illustrative of one exemplary routine of a hand-size structured-light three-dimensional metrology imaging device. At a block 610, a scan is started. At a block 620, the first/next contour image is acquired. At a block 630, a reference portion of the contour image is analyzed in a "real time" manner, to determine the amount of y-displacement (if any) relative to a previous contour image. (The first contour image of a scan is automatically treated as a significant displacement in the routine 600.) In one embodiment, this operation may determine the displacement between y-values that are determined as described above with reference to the reference object 415 or 415', although in one embodiment a simpler analysis of the change in displacement of the reference portion (in units of pixels) may be used.

If the block 630 is performed, then at a decision block 640, a determination is made in a "real time" manner as to whether the y-displacement is significant. If the y-displacement is not determined to be significant, then the routine returns to block 620 where the next contour image is acquired. If the y-displacement is determined to be significant, then at a block 650 the contour image is saved. Blocks 630 and 640 may be utilized to save memory space in the device when the user moves the device very slowly to insure closely spaced contour images (or stops) and a subsequent contour image is acquired closer than a desired spacing relative to a previous contour image.

At a decision block 660, a determination is made as to whether the end of the scan has been reached, e.g., based on whether the user has pressed the scan acquisition button 354 to end the scan, or whether the contour image memory is full. If the end of the scan has not been reached, then the routine returns to block 620. If the end of the scan has been reached, then the routine continues to a block 670, where the relative y-coordinate for each contour image is determined based on an analysis of the reference portion of the contour images. At a block 680, a surface map is determined based on the contour image data, as previously described. At a block 690, the surface map is stored and/or displayed as previously described.

Figure 11:
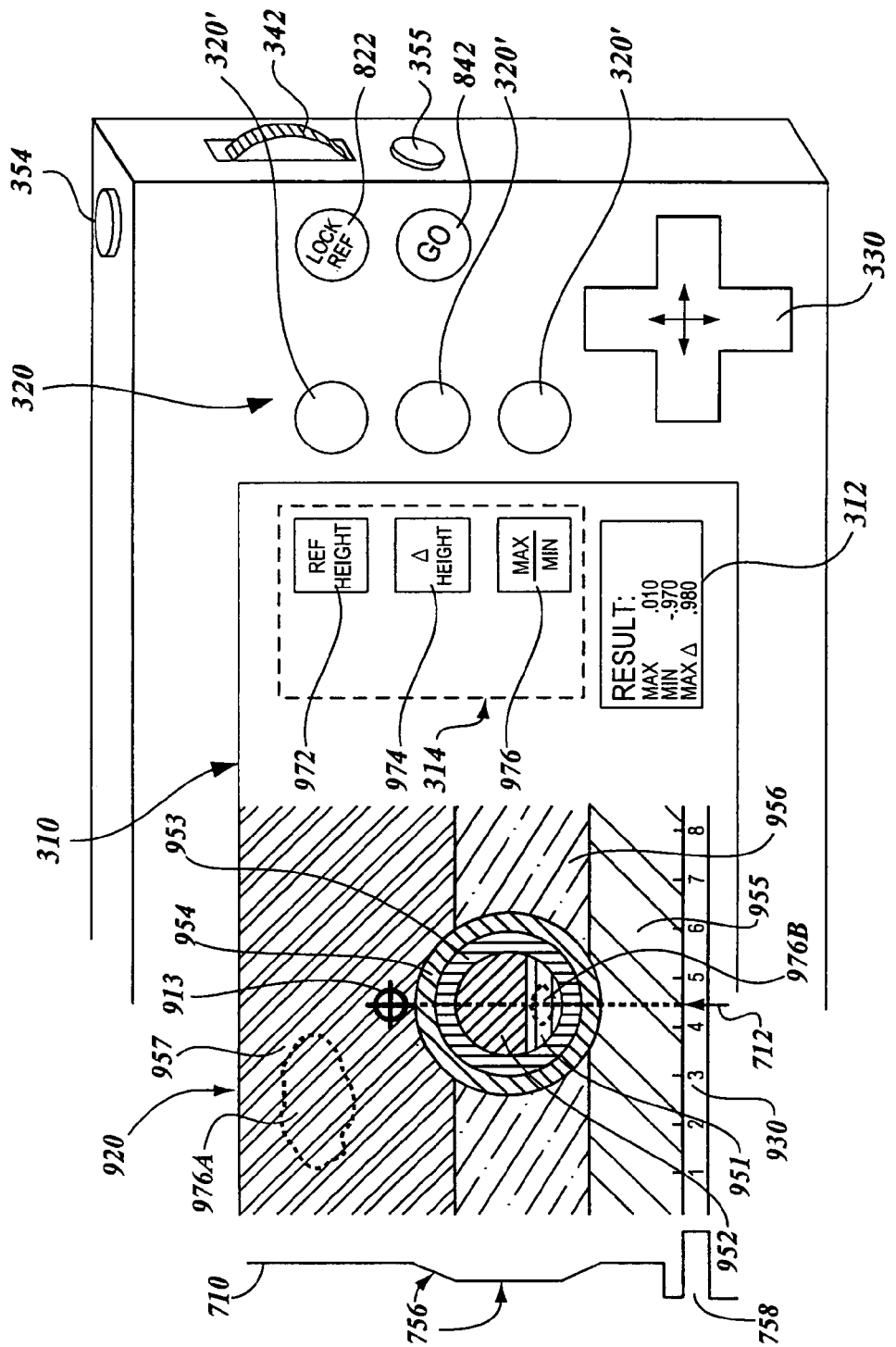
FIG. 11 is a diagram of one exemplary layout usable for the control panel and display portions of FIG. 3.

FIG. 11 is a diagram of one exemplary arrangement that may be used for the display region 310, control button region 320, cursor control 330, thumbwheel 342, a lighting button 355 (optional), and scan acquisition button 354 of the exemplary electronic portion 300 shown in FIG. 3. As shown in FIG. 11, the display portion 310 may include the adaptable icon/label region 314, which may in one configuration include a reference height tool icon 972, z-height difference tool icon 974, and a maximum-minimum z-height difference tool icon 976. The measurement result region 312 may display a measurement result obtained by use of the video tools, or other means. The control button region 320 may include control buttons 320' that may have predetermined control functions in some embodiments. However, in other embodiments, each respective control button 320' is preferably useable to activate the operations associated with whatever adjacent respective adaptable tool icon, menu item, or the like, that is currently displayed in the adaptable icon/label region 314. The control button region 320 may include additional control buttons, such as a lock reference button 822 and a go button 842, which may provide operations outlined further below.

It should be appreciated that a rotary control element, such as the thumbwheel 342, or the like, may be a particularly versatile control element for use in a compact electronic portion 300. It may be particularly convenient for performing various adjustments, for example, as outlined further below. Alternatively, a rotary control element that has its face exposed, rather than its periphery, may be suitably positioned on an electronic portion 300, and used instead of a thumbwheel. However, despite certain advantages, the arrangement of features shown in FIG. 11 and the functions described above are exemplary only, and not limiting. Fewer, more, or different, control elements and/or functions may be provided in various embodiments.

FIG. 11 also schematically shows an exemplary surface map display 920 and other displayed features in the display region 310, including exemplary video tool results shown as overlays, all as described below. The surface map display 920 shows z-height ranges 951-957, where increasing numbers correspond to increasing z-height. The contour image display 710, shows the contour image that corresponds to a location indicator 712 that may be positioned anywhere along the y-axis direction (horizontally in FIG. 11.) The contour image display 710 includes a workpiece portion 756 and a reference object portion 758. Instead of showing z-height ranges adjacent to the reference object portion 758, a display region 930 may show a y-axis coordinate scale derived from the reference object z-heights in the underlying surface map data, for example, in millimeters.

Exemplary video tool results shown in FIG. 11 include the result of using the reference height tool 972 and the maximum-minimum z-height difference tool 976. In response the user pressing the control button 320 corresponding to the reference height tool icon 972, reference point indicator 913 automatically appears in the display region 310 at a default location. The user may then move the reference point indicator 913 to a desired location using the cursor control 330, and press the GO button 842. In response, the z-height in the underlying surface map data corresponding to the location of the reference point indicator 913 will be used as an offset subtracted from the raw z-height values before displaying z-height results to the user. Also, the reference point indicator 913 will be locked at that position relative to the surface map display 920, that is, if the surface map display 920 is scrolled, the reference point indicator 913 will scroll with it.

In response the user pressing the control button 320 corresponding to the maximum-minimum z-height difference tool 976, the electronic portion 300 automatically searches a region of interest, which by default may correspond to the visible portion of the surface map display 920, for the maximum z-height point and minimum z-height point (excluding outliners). Then, the closet neighbors of those respective z-height points that fall within a narrow z-height range (for example, within the measurement uncertainty or little more) of those points are automatically identified and associated with the respective points. The two resulting groups are then displayed on the surface map display 920 in a distinctive manner, for example, as indicated in FIG. 11 by maximum z-height region 976A and the minimum z-height region 976B. The measurement result region 312 shows the average height of the displayed regions 976A and 976B, and the difference in height between them.

Regarding FIGS. 12-14, the surface map display z-height region codes or colors that are normally shown in the display region are not shown in the following FIGS. 12-14, for clarity of illustration. It should be understood that the workpiece lines or boundaries in the display region of FIGS. 12-14 represent the boundaries between z-height regions that would normally be shown in display region. Furthermore, as previously outlined, the actual surface map used to generate a surface map display may have far greater measurement resolution than can be practically indicated in the surface map display. Therefore, in various embodiments, when measurements are defined and performed using a video tool on a surface map display, the underlying data of the actual surface map that corresponds to the defined measurement locations may be used to provide the best possible measurement results. The underlying surface map data that may be analyzed or processed by a video tool may be formatted for compatibility with that tools, if required, as previously described herein.

Figure 12A:
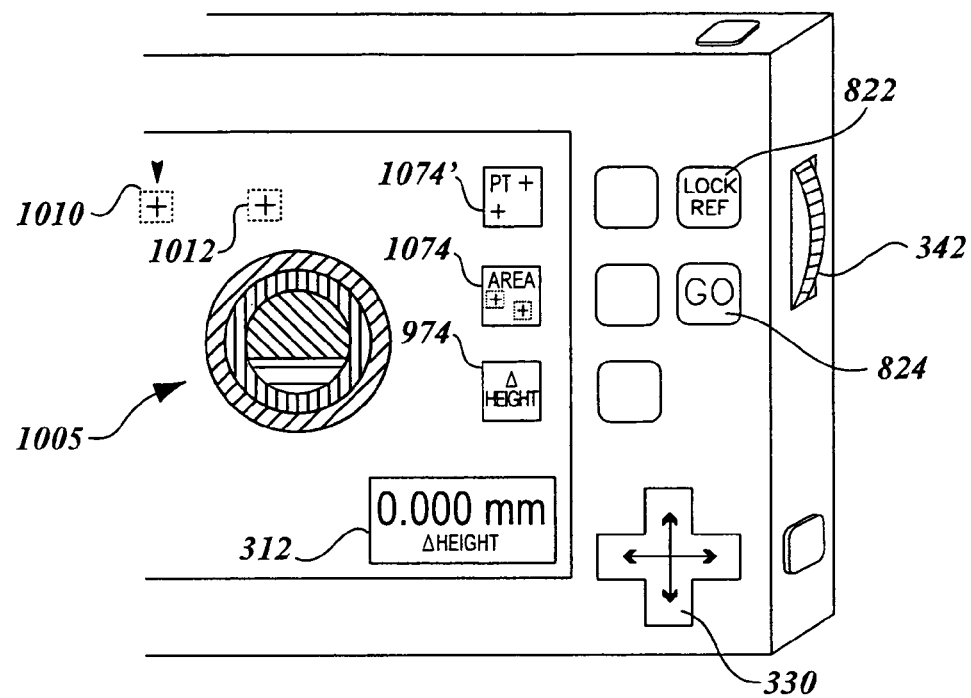
FIGS. 12A-12D are diagrams of the control panel and display portions of FIG. 3 illustrating the use of a "delta height" tool.

FIGS. 12A-12D illustrate one exemplary set of operations usable to implement a "delta height" video metrology tool, for a feature previously described with reference to FIG. 11. Starting from the arrangement of icons 972, 974 and 976 shown in FIG. 11, a user may activate the delta height tool 974 (for example, by pressing the adjacent control button). In response, the delta height tool icon 974 may be relocated, and the arrangement of icons 974, 1074 and 1074' may be displayed as shown in FIG. 12A. The icons 1074 and 1074' may correspond to two slightly different versions of the delta height tool. As indicated by the visual appearance of icon 1074', when the delta height video tool version 1074' is activated, (for example, by pressing the adjacent control button), a z-height difference will be found between two precise points on a workpiece surface. In contrast, as indicated by the visual appearance of icon 1074, when the delta height video tool version 1074 is activated, a z-height difference will be found between the average z-heights of two small regions. Otherwise, the two versions may operate similarly.

In the example shown in FIGS. 12A-12D, the delta height video tool version 1074 has been activated. As a result, the corresponding height region indicators 1010 and 1012 may appear at a default location in the display region 310. The measurement result region 312 may begin to continuously update and display the current measurement distance between the height region indicators 1010 and 1012. One of the height region indicators, in this case the height region indicator 1010, may include a "currently active" indicator, for example, the small arrowhead located just above the height region indicator 1010 in FIG. 12A, to show that it is the target for the next positioning or adjustment operation.

Figure 12B:
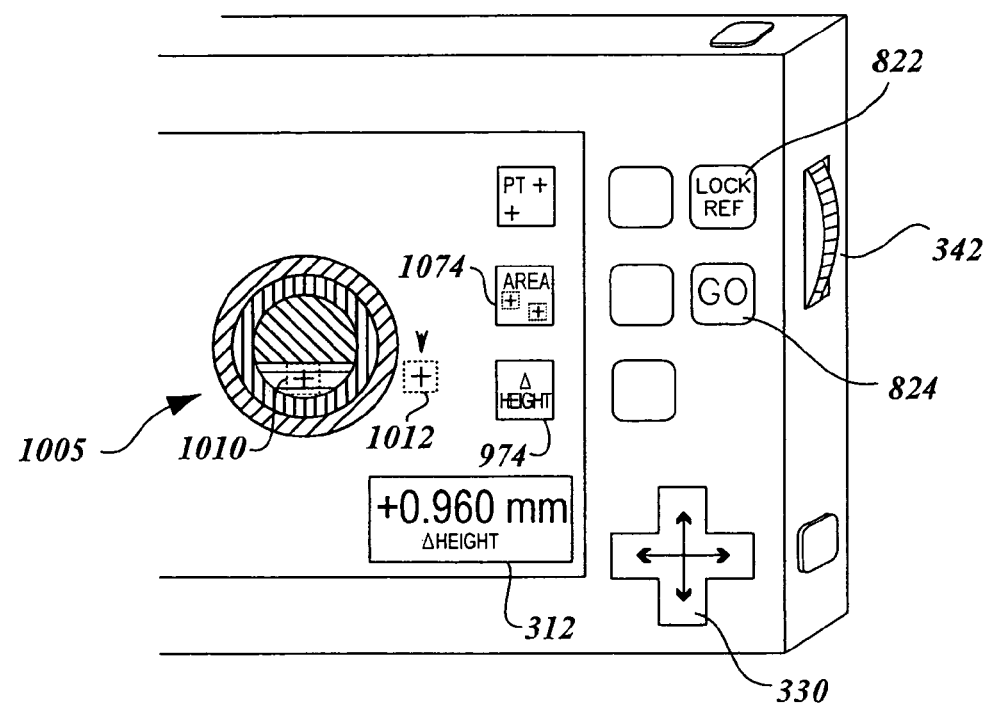

As shown in FIG. 12B, the user may then move the "currently active" height region indicator 1010 down to a desired measuring position on the workpiece 1005 using the cursor control 330, or other suitable now-known or later-developed control element, including a touch screen drag operation and/or a stylus, or the like. In the embodiment shown in FIG. 12B, the entire video tool is dragged along with this change in the position of the height region indicator 1010, however, in various embodiments the height region indicator 1010 may move independently from the height region indicator 1012. In any case, after positioning the height region indicator 1010, the user may then press the "LOCK REF" button 822, to lock the current position of the height region indicator 1010 as a reference height region for a measurement. This operation may also trigger the "currently active" indicator to appear near the height region indicator 1012, to show that it is the target for the next positioning or adjustment operation.

Figure 12C:
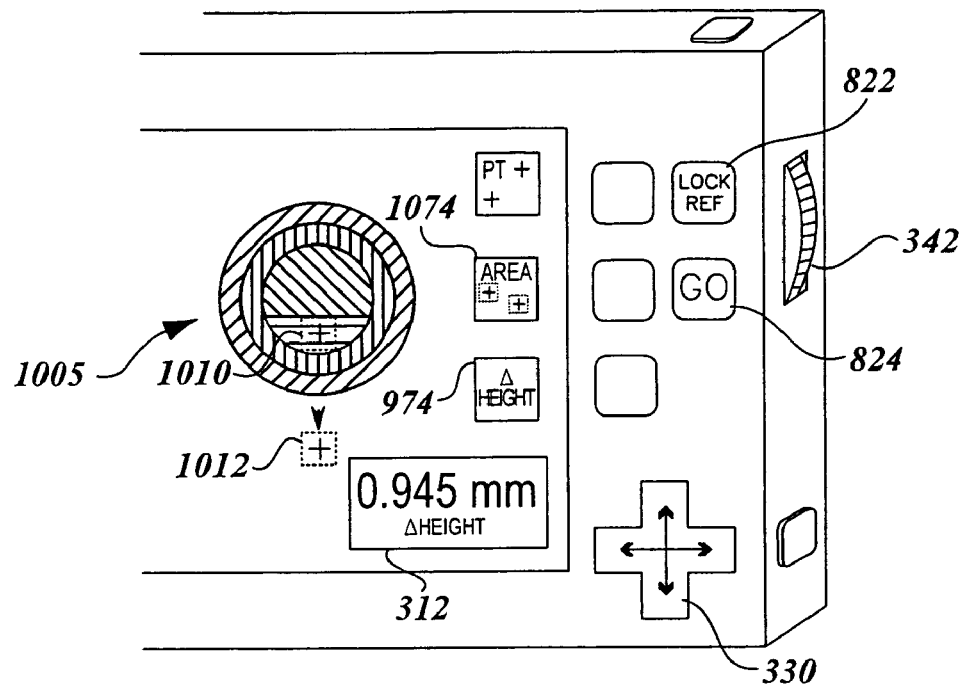

As shown in FIG. 12C, the user may then move the "currently active" height region indicator 1012 to a desired measuring position on the workpiece 1005, using the cursor control 330, or the like. The measurement result region 312 may continue to update and display the current measurement distance between the height region indicators 1010 and 1012.

Figure 12D:
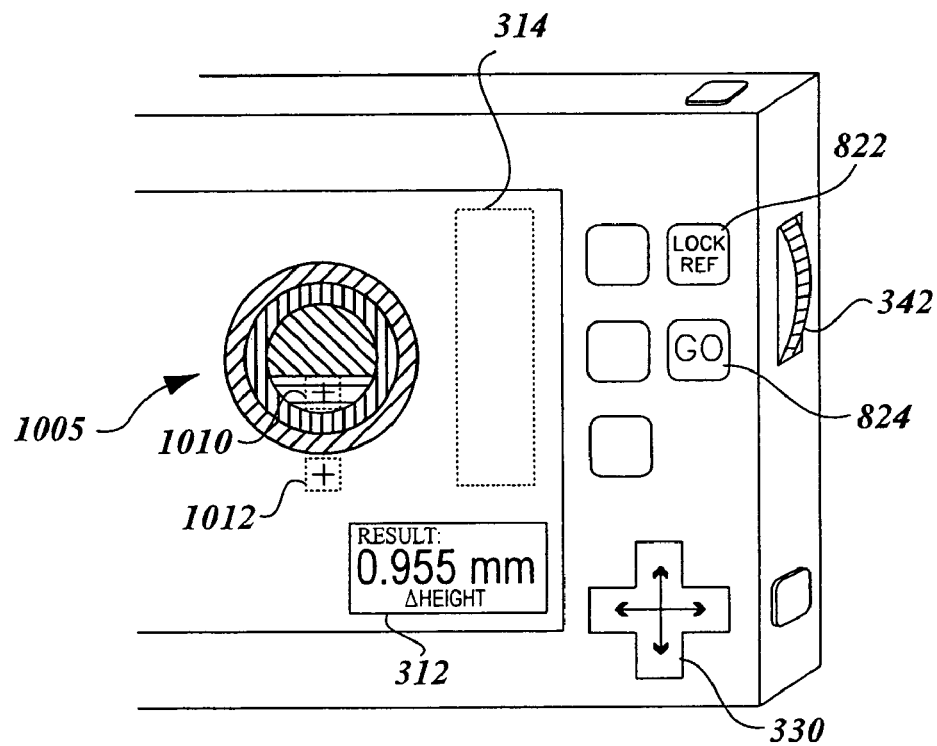

As shown in FIG. 12D, in an additional optional step for the delta height tool, the user may press the "GO" button 824, to indicate completion of the previous measurement set-up operations. As a result, the "currently active" indicator may disappear, the height region indicator 1012 may be locked in position, and the associated final measurement result, which represents the distance between the height region indicators 1010 and 1012, may be displayed as a "RESULT" in the measurement result region 312. In addition, in various embodiments, when the "GO" button 824 is pressed to indicate completion of the previous measurement set-up operations, the control element configuration and/or contents of the adaptive icon/label region 314 may be updated to include new control options associated with the control buttons 320'. In various exemplary embodiments, the "GO" button 824 may function similarly to the conventional "ENTER" key function on a conventional computer keyboard. In one embodiment, when the "GO" button 824 is selected to complete the operation of the delta height tool, a sequence of "save" or "repeat" operations similar to those described below with reference to FIGS. 20-22 may be initiated.

Figure 13A:
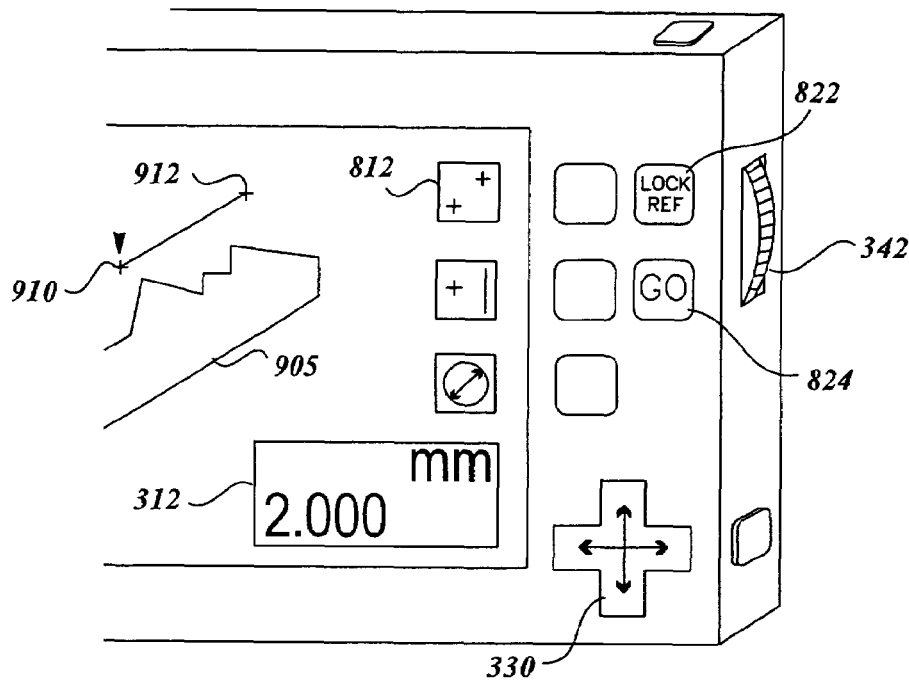
FIGS. 13A-13D are diagrams of the control panel and display portions of FIG. 3 illustrating the use of an exemplary point-to-point tool.

FIGS. 13A-13D illustrate one exemplary set of operations usable to implement a point-to-point video metrology tool. As shown in FIG. 13A, once the point-to-point tool icon 812 is selected (for example, by pressing the adjacent control button), point indicators 910 and 912 may appear at a default location in the display region 310. The measurement result region 312 may begin to continuously update and display the current measurement distance between the point indicators 910 and 912. One of the point indicators, in this case the point indicator 910, may include a "currently active" indicator, for example, the small arrowhead located just above the point indicator 910 in FIG. 13A, to show that it is the target for the next positioning or adjustment operation.

Figure 13B:
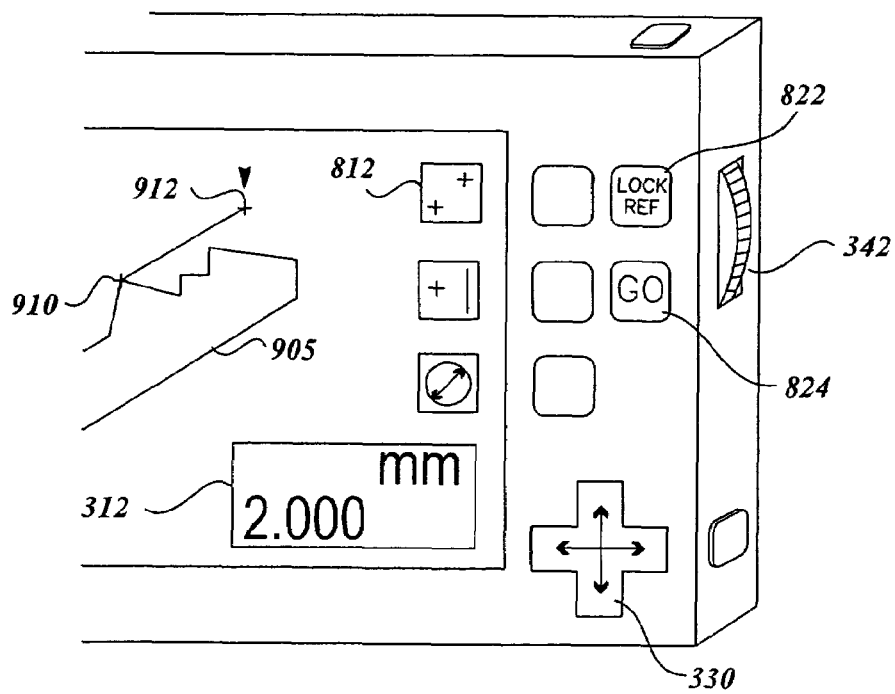

As shown in FIG. 13B, the user may then move the "currently active" point indicator 910 down to a desired measuring position on the workpiece 905 using the cursor control 330, or other suitable now-known or later-developed control element, including a touch screen drag operation and/or a stylus, or the like. In the embodiment shown in FIG. 13B, the entire video tool is dragged along with this change in the position of the point indicator 910, however, in various embodiments the point indicator 910 may move independently from the point indicator 912. In any case, after positioning the point indicator 910, the user may then press the "LOCK REF" button 822, to lock the current position of the point indicator 910 as a reference point for a measurement. This operation may also trigger the "currently active" indicator to appear near the point indicator 912, to show that it is the target for the next positioning or adjustment operation.

Figure 13C:
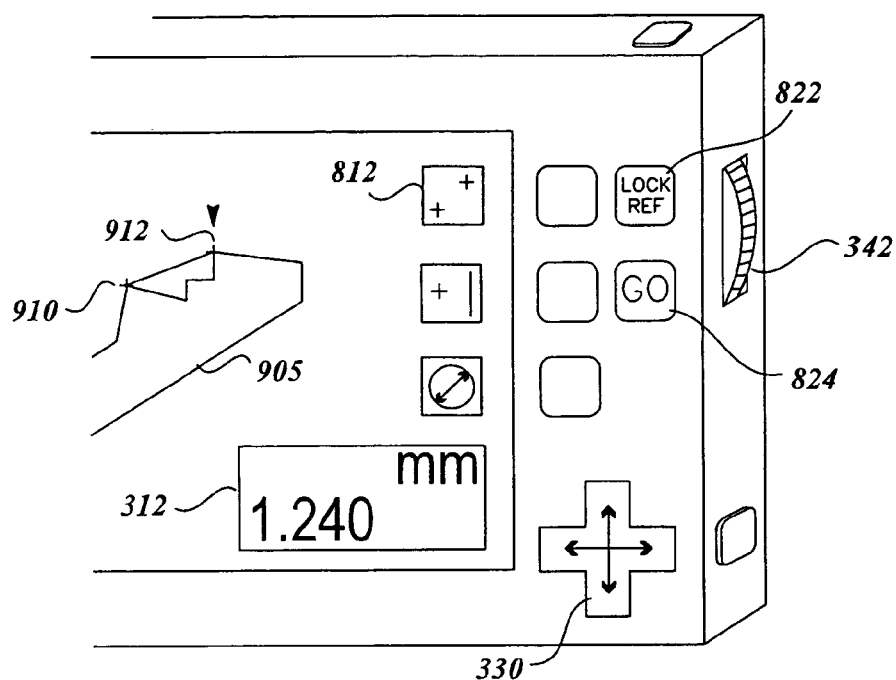

As shown in FIG. 13C, the user may then move the "currently active" point indicator 912 down to a desired measuring position on the workpiece 905 using the cursor control 330, or the like. The measurement result region 312 may continuously update and display the current measurement distance between the point indicators 910 and 912.

Figure 13D:
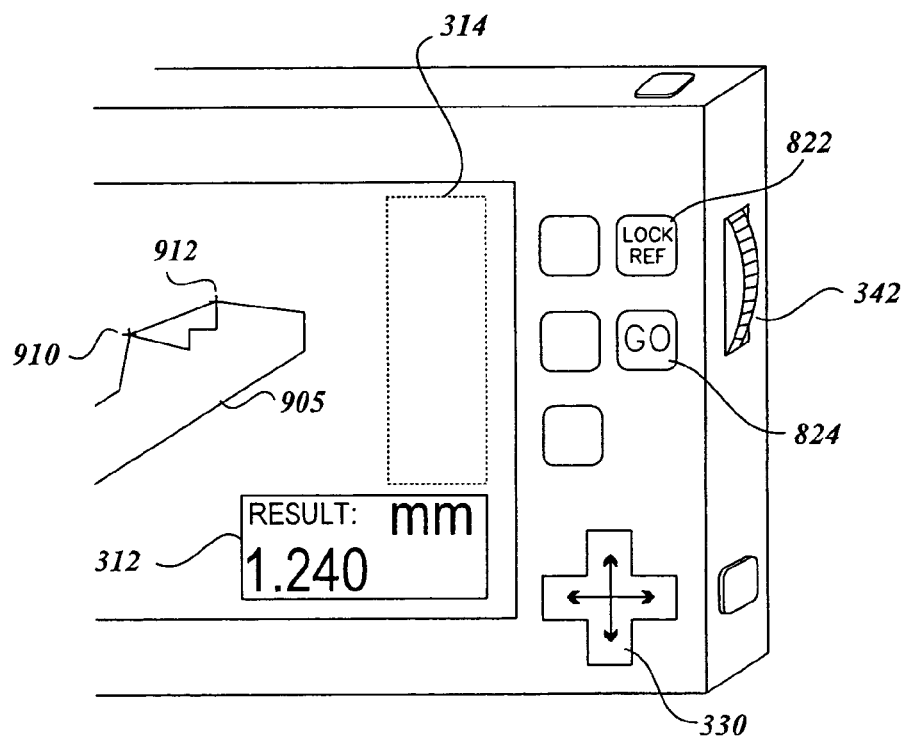

As shown in FIG. 13D, in an additional optional step for the point-to-point tool, the user may press the "GO" button 824, to indicate completion of the previous measurement set-up operations. As a result, the "currently active" indicator may disappear, the point indicator 912 may be locked in position, and the associated final measurement result, which represents the distance between the point indicators 910 and 912 may be displayed as a "RESULT" in the measurement result region 312. In addition, in various embodiments, when the "GO" button 824 is pressed to indicate completion of the previous measurement set-up operations, the control element configuration and/or contents of the adaptive icon/label region 314 may be updated to include new control options associated with the control buttons 320'. In various exemplary embodiments, the "GO" button 824 may function similarly to the conventional "ENTER" key function on a conventional computer keyboard. In one embodiment, when the "GO" button 824 is selected to complete the operation of the point-to-point tool, a sequence of "save" or "repeat" operations similar to those described below with reference to FIGS. 20-22 may be initiated.

In various embodiments of any of the video tools described herein, the "LOCK REF" button 822 may operate such that it may be used repeatedly to, in effect, control which of the point indicators, or other positionable tool components, are "currently active" and positionable. For example, in such embodiments, after positioning the "currently active" point indicator 912 as described above with reference to FIG. 13C, if the user then decides to further adjust the position of the previously positioned point indicator 910, the user may press the "LOCK REF" button again. As a result, the current position of the point indicator 912 would be locked as a reference point for a measurement and the "currently active" indicator would then appear near the point indicator 910 again, to show that it may once again be the target for a positioning or adjustment operation. In such embodiments, the "LOCK REF" button could be operated in this manner as many times as desired, to repeatedly "toggle" which of the point indicators or other tool components is currently active for positioning or adjustment. Of course, a different or additional control element could also be used to provide a similar function, if desired.

Figure 14A:
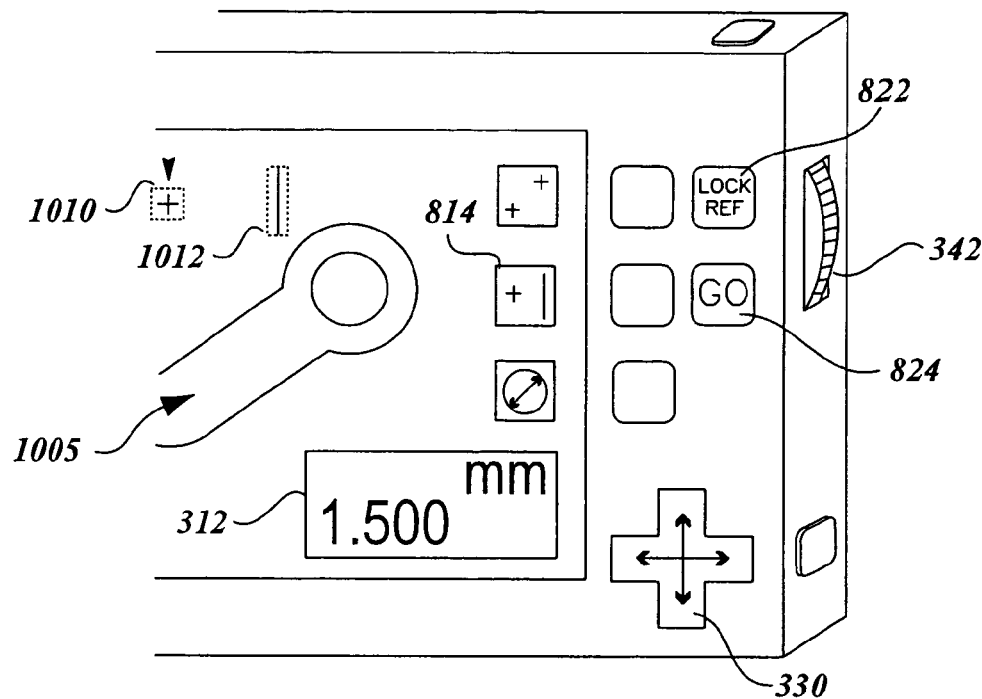
FIGS. 14A-14D are diagrams of the control panel and display portions of FIG. 3 illustrating the use of an exemplary point-to-line tool.

FIGS. 14A-14D illustrate one exemplary set of operations usable to implement a point-to-line video metrology tool. As shown in FIG. 14A, once the point-to-line tool icon 814 is selected (for example, by pressing the adjacent control button), an edge point tool component 1010 and a line tool component 1012 may appear at a default location in the display region 310. The measurement result region 312 may begin to continuously update and display the current measurement distance between the edge point tool component 1010 and a line tool component 1012. One of the tool components, in this case the edge point tool component 1010, may include a "currently active" indicator, for example, the small arrowhead located just above the edge point tool component 1010 in FIG. 14A, to show that it is the target for the next positioning or adjustment operation.

It should be appreciated that, whereas the point indicators 910 and 912 of the point-to-point tool may be passive elements that register a position according to their placement by the user, the point-to-line tool components 1010 and 1012 include automatic edge/boundary detection capabilities, according to known methods. For example, a similar point tool and line tool (also referred to as a box tool), may be found in QVPAK® software (see the QVPAK 3D CNC Vision Measuring Machine User's Guide, incorporated by reference above.) Briefly, a point tool generates (locates) a measurement data point at the intersection of a single video scan line (that is, a line of image pixels) with an edge feature in an image. A line or box tool generates a series of parallel scan lines, each of which returns a data point where an edge feature is found. Generally, such tools operate (that is, perform their automatic edge-detection operations) within a defined region of interest, which is often circumscribed by a region of interest boundary on a display, in order to indicate the location of the region of interest. The region of interest of the edge point tool component 1010 and a line tool component 1012 are similarly indicated by the circumscribing dashed lines shown in FIGS. 14A-14D.

Figure 14B:
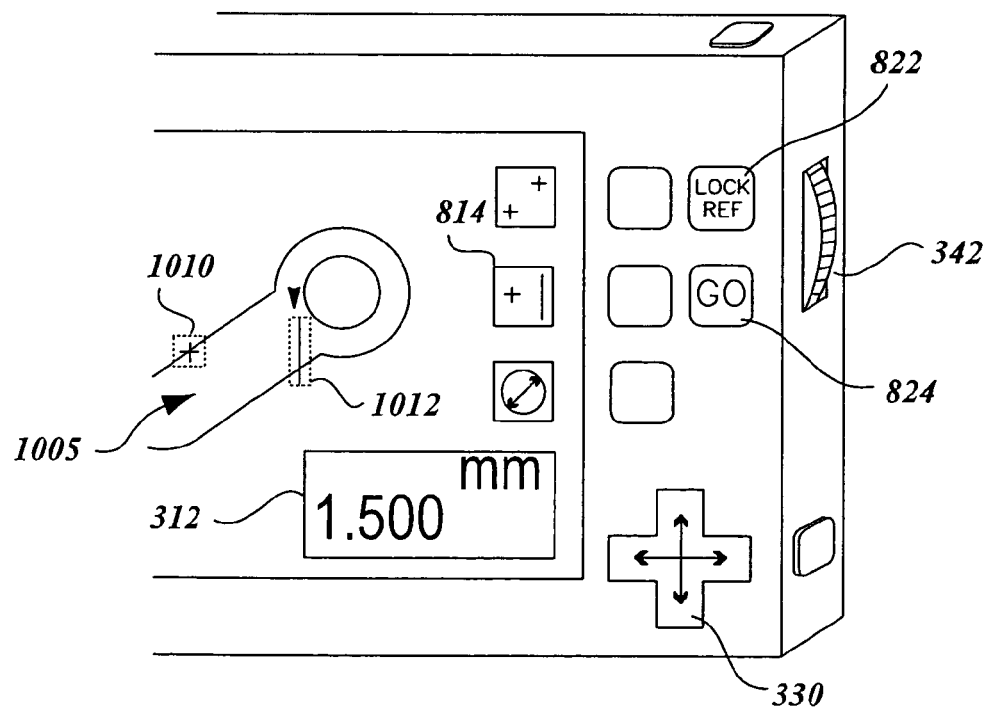

As shown in FIG. 14B, the user may then move the "currently active" edge point tool component 1010 to a desired measuring position on the workpiece 1005 using the cursor control 330, or other suitable control element. In the embodiment shown in FIG. 14B, the entire video tool is dragged along with this change in the position of the edge point tool component 1010, however, in various embodiments the edge point tool component 1010 may move independently from the line tool component 1012. In any case, after positioning the edge point tool component 1010, the user may then press the "LOCK REF" button 822, to lock or anchor the current position of the region of interest of the edge point tool component 1010. This operation may also trigger the "currently active" indicator to appear near the line tool component 1012, to show that it is the target for the next positioning or adjustment operation.

Figure 14C:
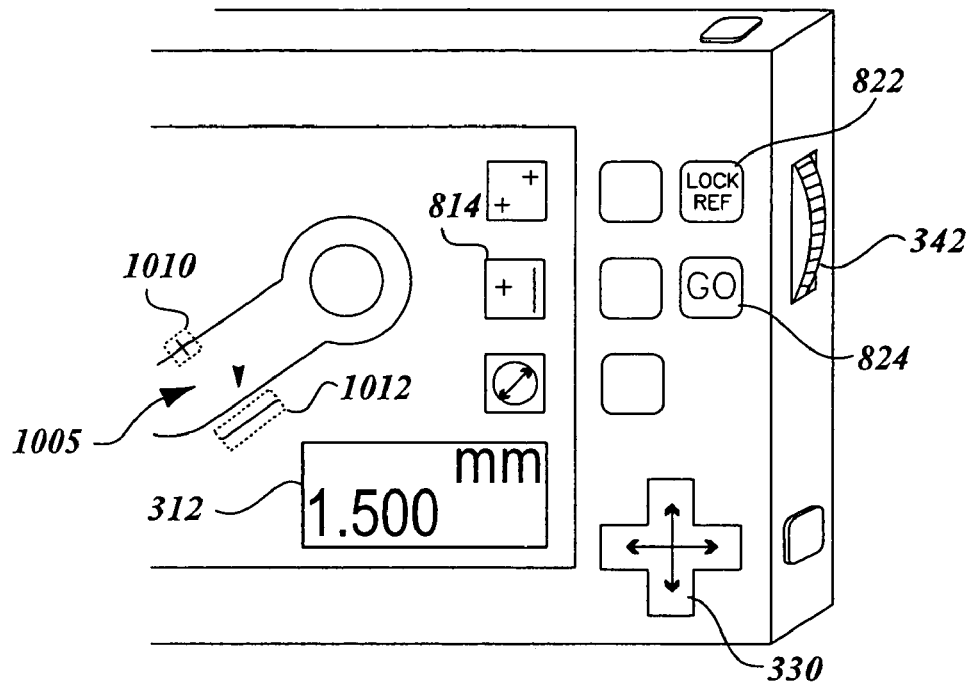
Figure 14D:
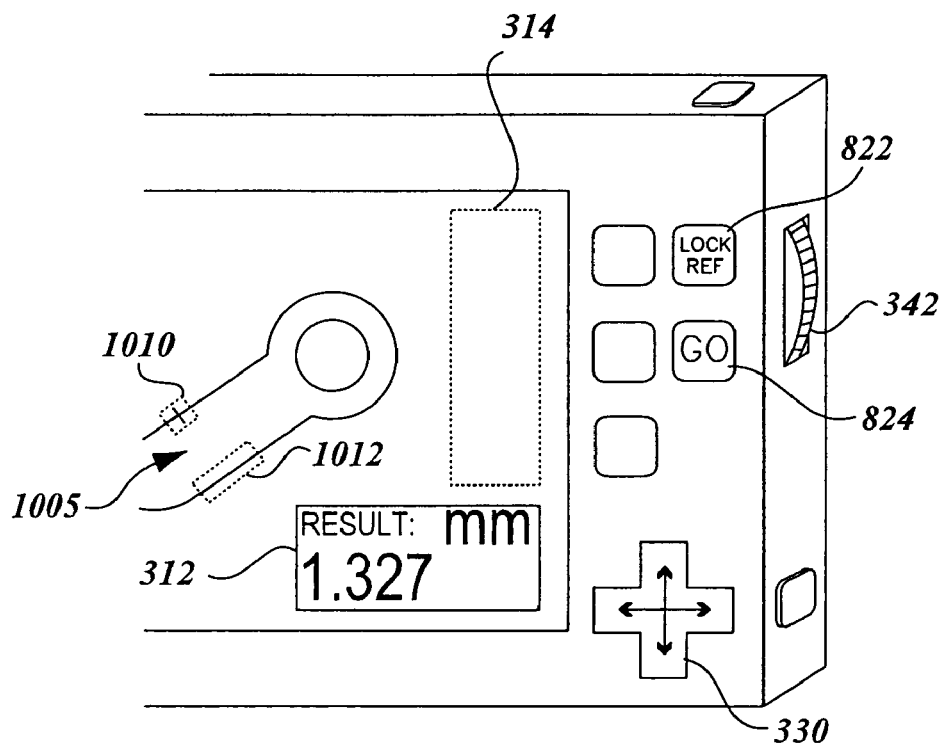

The user may then move the "currently active" line tool component 1012 to a desired measuring position on the workpiece 1005. In one embodiment, the user may first rotate the orientation of the line tool component 1012 as though it was rotated about a center of rotation at the edge point tool component 1010 reference location, as shown in FIG. 14C. In one embodiment, the thumbwheel 342 may be used to rotate or set the orientation. Then, as shown in FIG. 14D, the user may press the "GO" button 824 to accept and lock the orientation. In one embodiment, the "currently active" indicator may then disappear and be replaced by a "separation distance mode" indicator, such as the dashed line joining the tool components 1010 and 1012 in FIG. 14D. In one embodiment, the thumbwheel 342 may be used to adjust or set the location of the region of interest of the line tool component 1012 along the direction of the current orientation, (which may be along the direction of the dashed line "separation distance mode" indicator, for example), to a desired measuring position on the workpiece 1005. Then, with the region of interest indicators positioned to bound the edge features that provide the basis for the point-to-line distance measurement, the user may press the "GO" button, to cause the point-to-line tool to automatically determine the location of an edge point in the region of interest of the edge point tool component 1010, the location of a line defined by the linear edge in the region of interest of the line tool component 1012, and the distance of the edge point from the line along a direction perpendicular to the line. The determined point-to-line distance may then be displayed in the measurement result region 312. In addition, in various embodiments, when the "GO" button 824 is pressed to indicate completion of the previous measurement set-up operations, the control element configuration and/or contents of the adaptive icon/label region 314 may be updated to include new control options associated with the control buttons 320'.

Figure 15:
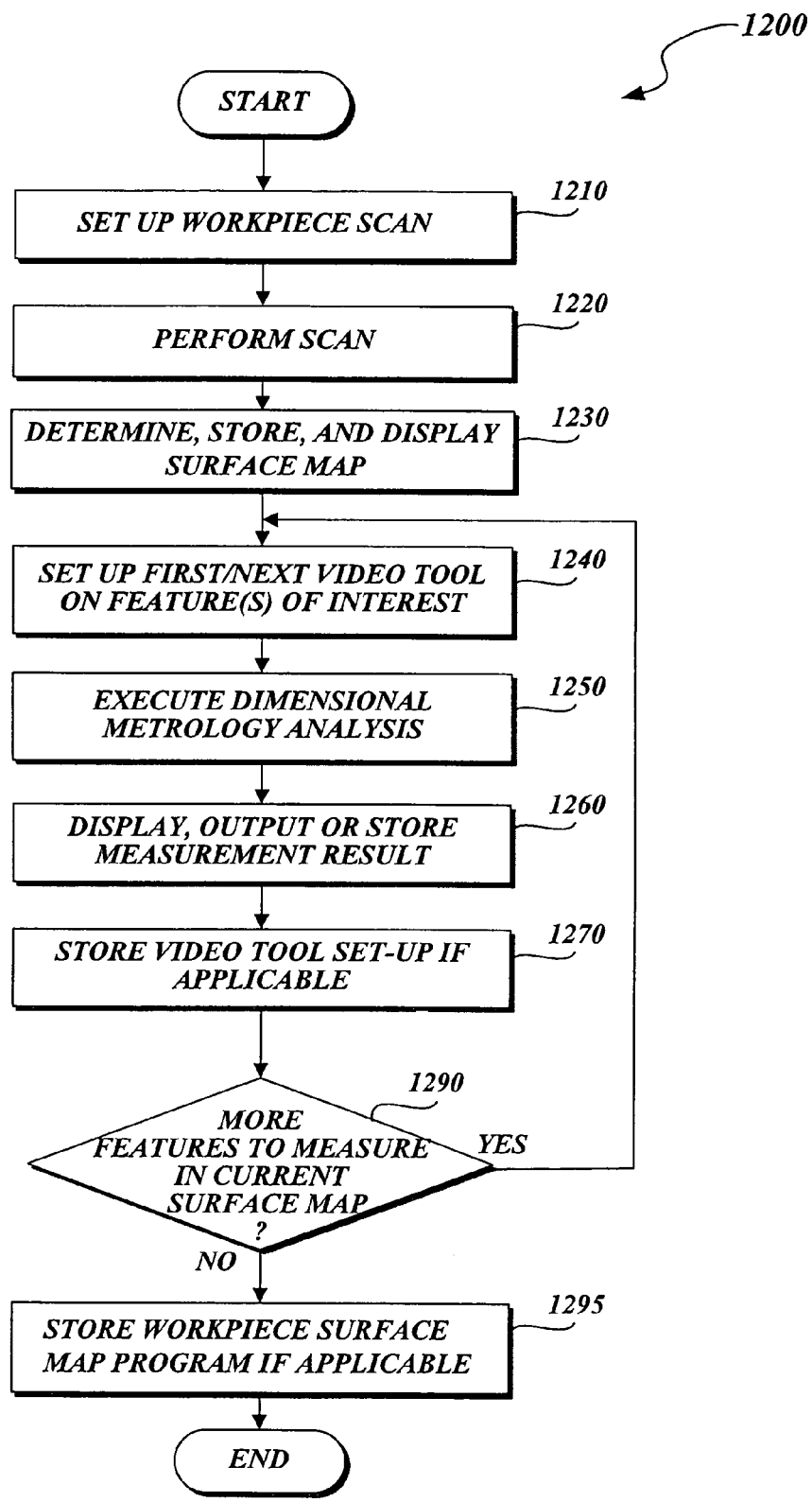
FIG. 15 is a flow diagram illustrative of one exemplary routine for a video tool operation of a hand-size structured-light three-dimensional metrology imaging device.

FIG. 15 is a flow diagram illustrative of one exemplary routine 1200 for the operation of a hand-size structured-light three-dimensional metrology imaging device using a video tool such as one of the video tools of FIGS. 12-14, for example. At a block 1210, user sets up the workpiece scan, for example as previously described with reference to FIG. 8 or 9, or elsewhere herein. At a block 1220 the user performs the workpiece scan, and at a block 1230 the workpiece scan data is analyzed to determine, store, and display a surface map, all as previously described herein. The operations of block 1230 may be performed automatically, for example by the electronic portion 300, when the scan is ended as previously described herein. At a block 1240, the user may set up a first/next video tool on features of interest. The "set up" of a video tool is exemplified by the state of a video tool just prior to the user pressing the "GO" button to indicate the completion of the previous measurement set-up operations and to determine a result in the descriptions of FIGS. 12-14. At a block 1250 the dimensional metrology analysis operations of the video tool may be automatically executed (in response to the user pressing the "GO" button, for example) and that a block 1260 the measurements resulting from the operations of block 1250 may be displayed, output, or stored, either automatically, or with user assistance, in various embodiments. Generally speaking, the operations of the blocks 1240-1260 may be performed in a manner exemplified by the previous descriptions of FIGS. 12-14. At a block 1270, the video tool set up used for the previous operations is stored, if applicable, for example if the user anticipates reusing the same video tool set up on a similar workpiece in the future. If a previous video tool set up has been stored during the operations of the routine 1200 for the current workpiece surface map, the current video tool set-up may be stored in conjunction and/or in sequence with that previous video tool set-up, for example as described below with reference to the "SAVE STEPS" icon 1310, of FIG. 16. Then at a decision block 1290, the user determines or decides whether there are more features to measure in the current surface map. If there are, then operation continues with block 1240. If not, then operation continues to block 1295 where the workpiece surface map program (the previously stored sequence of video tool set-ups) developed by the routine 1200 is stored with a unique identifier (for example as described below with reference to the "SAVE STEPS" icon 1310, of FIG. 16) for future recall and use on the surface maps of similar workpieces, and the routine ends.

Figure 16:
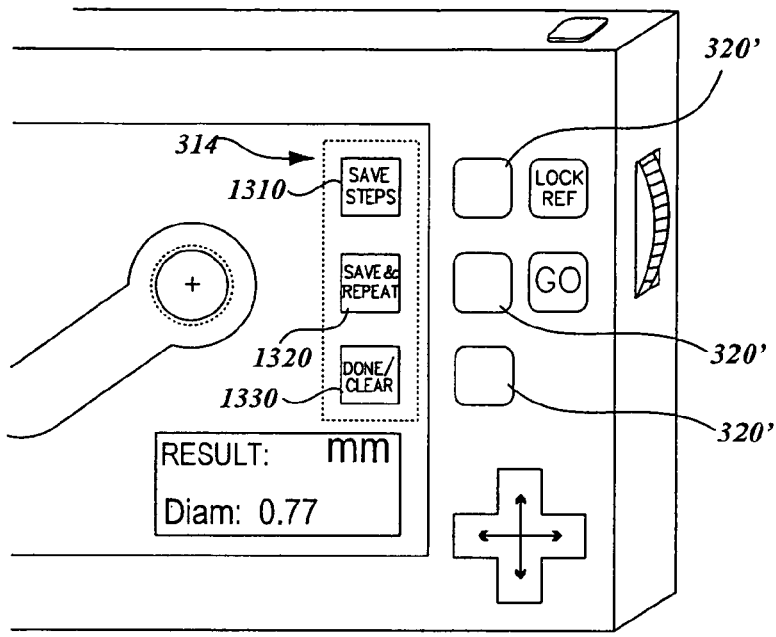
FIG. 16 is a diagram of the control panel and display portions of FIG. 3 illustrating one exemplary configuration of adaptable control elements usable in association with an exemplary measurement operation completion mode.

FIG. 16 is a diagram of the control panel and display portion 305 illustrating one exemplary configuration of adaptable control elements usable in association with an exemplary measurement operation completion mode. As previously outlined with reference to FIGS. 12-14, in various embodiments, when the "GO" button 824 is pressed to indicate completion of the previous measurement set-up operations, the control element configuration and/or contents of the adaptive icon/label region 314 may be updated to include new control options associated with the control buttons 320'. FIG. 16 shows one exemplary set of new control options. As shown in FIG. 16, the adaptive icon/label region 314 may be updated to include a "SAVE STEPS" icon 1310, a "SAVE & REPEAT" icon 1320, and a "DONE/CLEAR" icon 1330, for example. The operations associated with the "SAVE STEPS" icon 1310, which may be activated by pressing the adjacent control button 320', may include storing the measurement operation sequence that was used to obtain the previous measurement result(s) in memory, and providing control elements, such as a menu or a touch sensitive alphanumeric keypad overlaying the display region 310, or the like, such that the user may enter or confirm a unique identifier that may be used to recall that measurement operation sequence at a later time. The operations associated with the "SAVE & REPEAT" icon 1320, which may be activated by pressing the adjacent control button 320', may include storing the measurement operation sequence that was used to obtain the previous measurement result(s) in memory, and immediately repeating the measurement operation sequence, for example, as described below with reference to FIGS. 22A-22D. The operations associated with the "DONE/CLEAR" icon 1330, which may be activated by pressing the adjacent control button 320', may include clearing the screen overlay corresponding to the previous measurement operations and restoring the hand-size metrology imaging system to a state that is ready to accept a new sequence of scanning and/or measurement operations.

Figure 17:
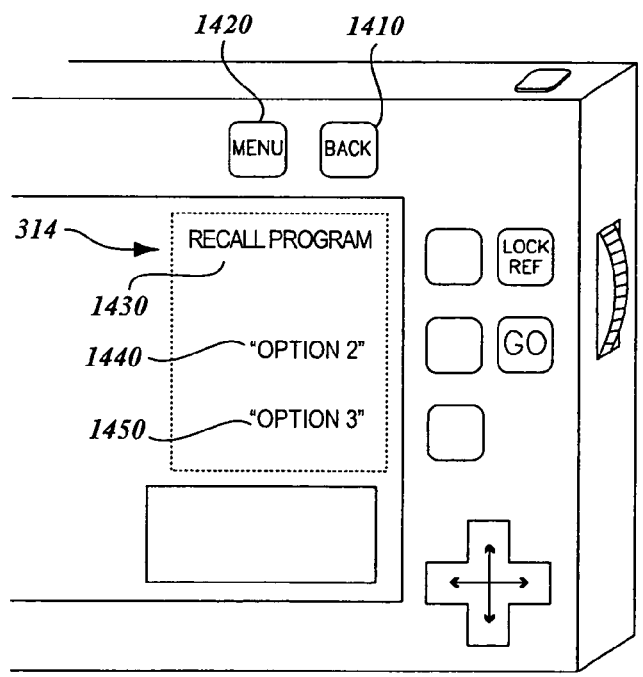
FIG. 17 is a diagram of the control panel and display portions of FIG. 3 illustrating one exemplary configuration of optional control elements usable in a hand-size structured-light three-dimensional metrology imaging device.

FIG. 17 is a diagram of the control panel and display portion 305 illustrating one exemplary configuration of additional or optional control elements that may be included in various embodiments of a hand-size 3D metrology imaging system. A "BACK" button 1410 may be provided, and may pressed in various operating states of the hand-size metrology imaging system to "undo" the effects of a previous operation or control action, such that an alternative or corrected operation or control action may be performed instead. A "MENU" button 1420 may be provided, and may be pressed in various operating states of the hand-size metrology imaging system to provide and/or display a new set of control options, file names, or the like, for selection by a user. In one embodiment, in an operation following completion of a previous sequence of measurement operations, or during a state immediately following power-on, or the like, when the "MENU" button 1420 is pressed, the adaptive icon/label region 314 may be updated to include a "RECALL PROGRAM" icon 1430, and other icon/labels 1440 and 1450, if desired, each of which may be activated by pressing the respective adjacent control button 320'. Then, when the control button 320' adjacent to the "RECALL PROGRAM" icon 1430 is pressed, a list or menu of the available previously-stored measurement operation sequences may be displayed for selection by the user. In one embodiment, the list or menu of the available previously-stored measurement operation sequences may be displayed in the adaptive icon/label region 314 in correspondence to the adjacent control buttons 320', which may be used to recall and initiate a desired measurement operation sequence. In such an embodiment, when an initial portion of the list or menu is displayed in the adaptive icon/label region 314, the thumb-wheel 342, or the like, may be activated such that it may be used to rapidly "scroll" new portions of the list or menu through the adaptive icon/label region 314, such that they may be selected and activated by pressing the adjacent control buttons 320'.

Figure 18A:
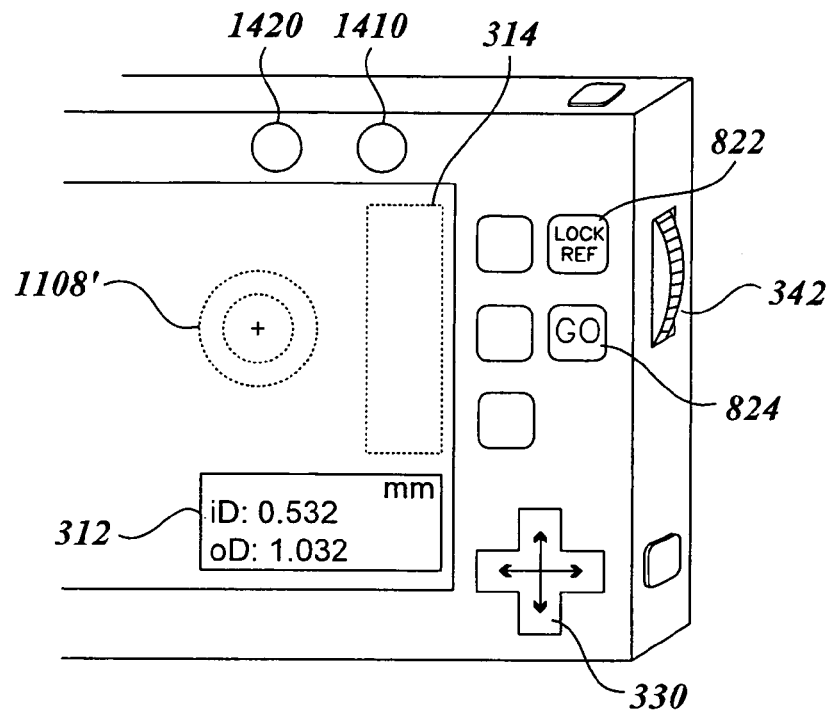
FIGS. 18A-18D are diagrams of the control panel and display portions of FIG. 11 illustrating the use of an exemplary program repeat or recall mode.

FIGS. 18A-18D illustrate one exemplary set of operations usable for a repeat or recall mode of operation for a hand-size metrology imaging system. The operations are illustrated by an example where the operations for the particular instance of a circle tool have been saved, for example by various control element operations outlined above, and then repeated or recalled. As shown in FIG. 18A, when the saved set of operations associated with the particular instance of the tool are repeated or recalled, the recalled instance of the tool may be displayed in the display region 310, as shown by the recalled tool region of interest 1108' in FIG. 18A (corresponding to the tool location and size parameters defined when the "GO" button was pressed during the original sequence of operations that was saved, and now recalled). The parameters of the video tool (the region of interest inner and outer diameters) may be temporarily displayed in the measurement result region 312.

Figure 18B:
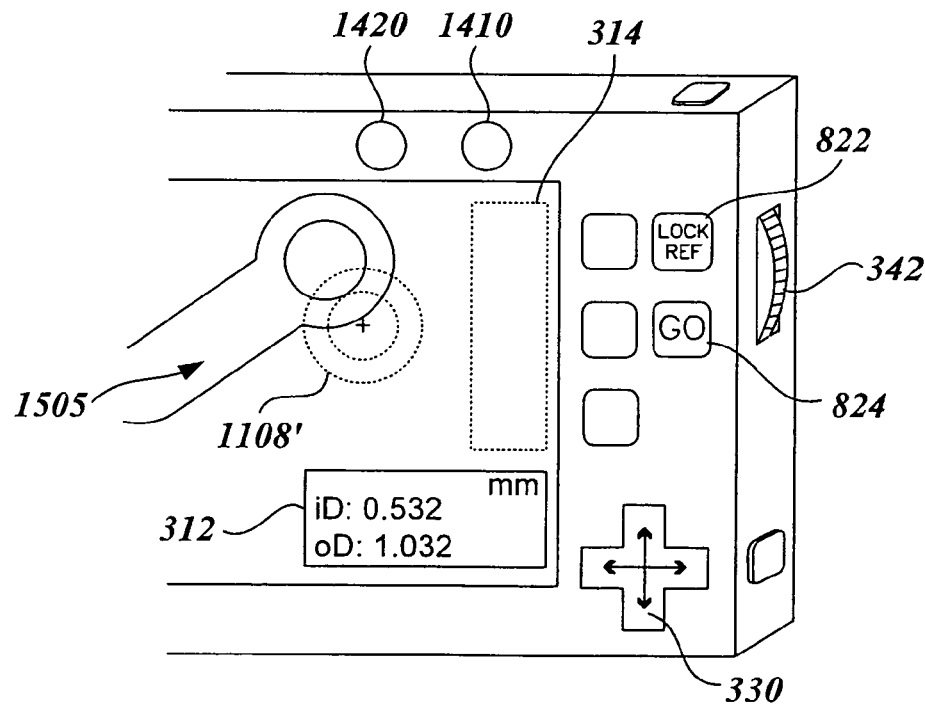
Figure 18C:
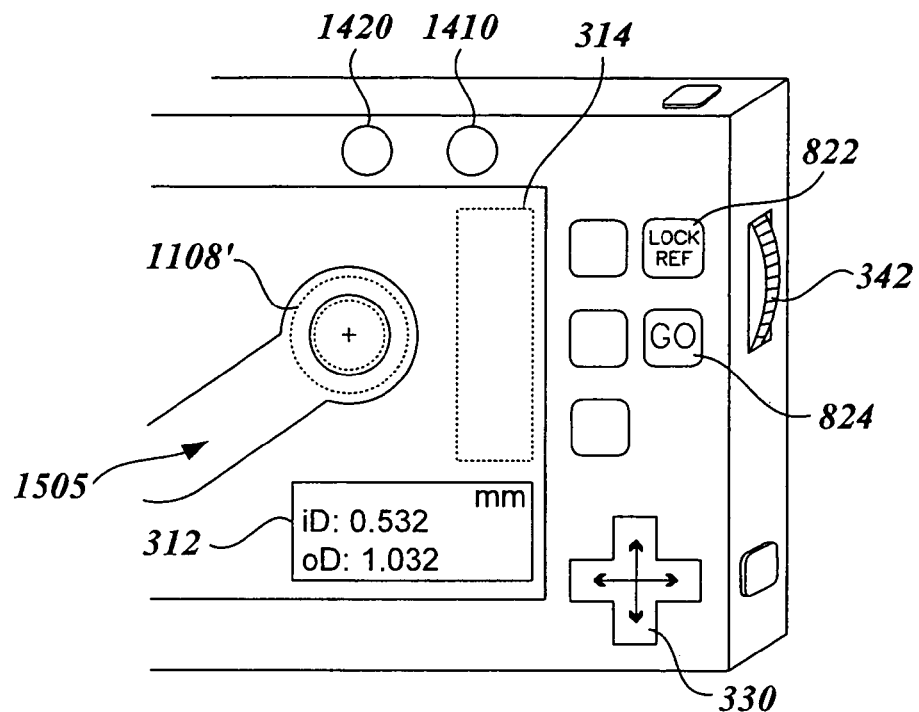
Figure 18D:
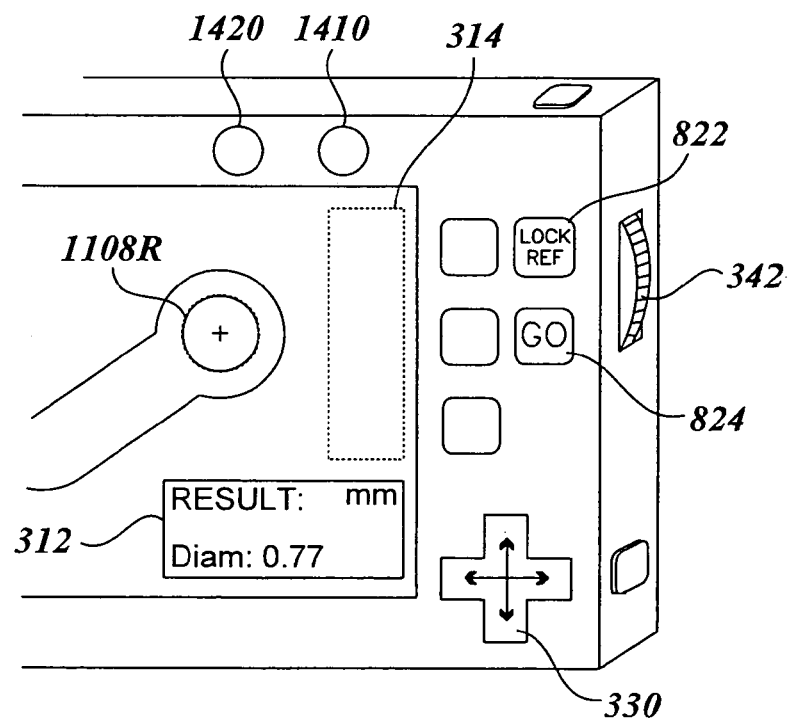

Then, as shown in FIG. 18B, the user may scroll a current surface map display (which may correspond to an underlying surface map that has been recently determined for a new workpiece, or a saved and recalled surface map), in the x-axis direction as well as the y-axis direction, if necessary, to bring a workpiece feature 1505 that is to be measured by the tool into the display region 310. FIG. 18B shows the desired workpiece feature 1505, when it is not yet properly positioned relative to the recalled tool 1108'. The desired workpiece feature 1505 is then properly positioned relative to the recalled tool 1108', as shown in FIG. 18C. Then, the user may press the "GO" button 824, to cause the tool to automatically determine the location of edge points along the edge in the region of interest. The measurement results may then be displayed in the measurement result region 312 and the corresponding resulting best-fit circle 1108R may be displayed as an overlay on the feature that was measured, as shown in FIG. 18D. In addition, in various embodiments, when the "GO" button 824 is pressed to indicate completion of the previous measurement operations, the control element configuration and/or contents of the adaptive icon/label region 314 may be updated to include new control options associated with the control buttons 320'.

Figure 19C:
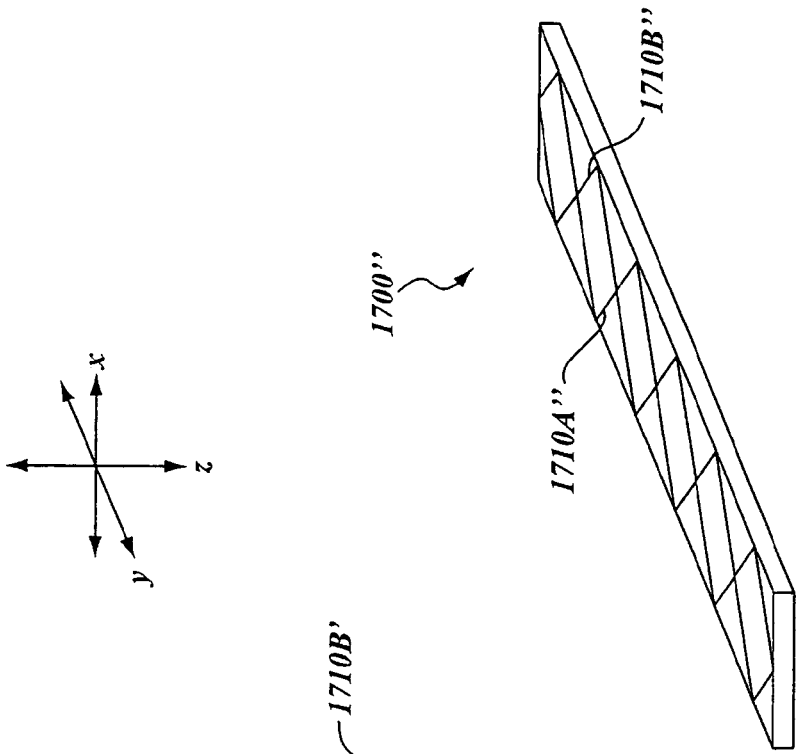
FIGS. 19A-19C are diagrams of various alternative reference objects that may be used in conjunction with a hand-size structured-light three-dimensional metrology imaging device.
Figure 19B:
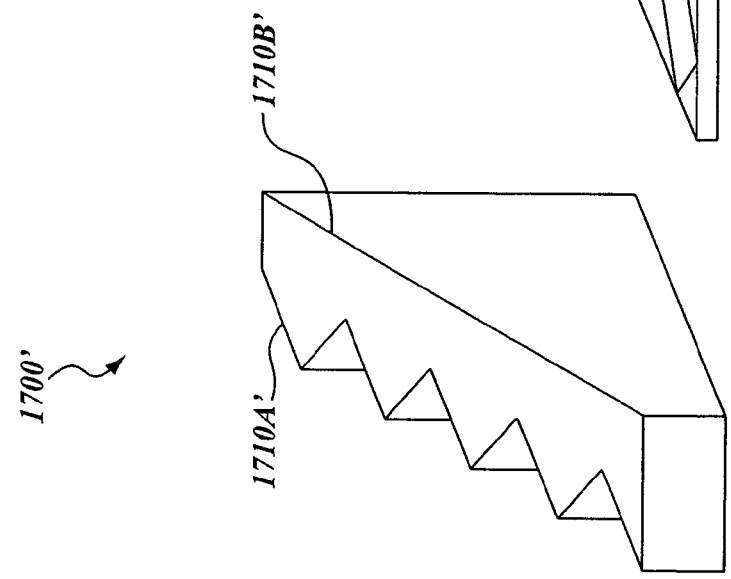
Figure 19A:
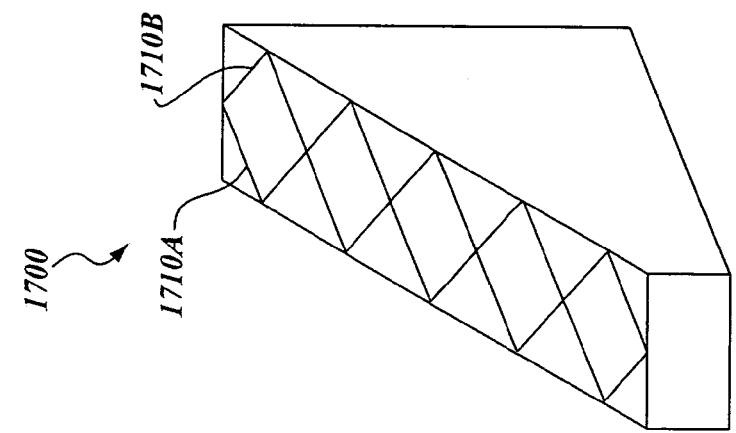

FIGS. 19A-19C are diagrams of alternative reference objects 1700, 1700' and 1700" that may be used in conjunction with a hand-size structured-light three-dimensional metrology imaging device. As shown in FIGS. 19A and 19B, the reference objects 1700 and 1700' are ramp-type reference objects that are used similarly to ramp-type reference objects previously described herein. However, in the case that the previously described conversion of ramp z-height to relative y-coordinate value does not provide the desired accuracy or resolution in an application, the reference objects 1700 and 1700' each include an additional feature that can provide additional y-coordinate resolution and/or accuracy. In each case, the additional feature exhibits a periodic width variation along the x-axis direction, to provide an x-width variation that can be converted to a y-coordinate, although there will be a periodic ambiguity between identical widths. However, the ambiguity may be eliminated by using the unambiguous y-coordinate provided by the ramp (and its known angle), in conjunction with the higher-resolution y-coordinate value provided by the periodic feature. The periodic feature may provide higher resolution than the ramp because it includes a known angle (between the lines measured for width) that is greater than that of the ramp.

The lines 1710A and 1710B of the periodic feature of the reference object 1700 may be provided by grooved lines (provided by precision etching to a depth that is clearly distinguishable in a contour image, or by other suitable means). For the reference object 1700', the periodic feature is the width between the edges 1710A' and 1710B'. The edge 1710A' may be fabricated by precision grinding, or the like.

All of the reference objects described previously include features having a dimension, along one of the x-axis direction and the z-axis direction, that varies according to a linear relationship with a changing position along the y-axis direction. However, it will be appreciated that, more generally, a reference object may include a dimension, along one of the x-axis direction and the z-axis direction, that varies according to non-linear relationship with a changing position along the y-axis direction, provided that the non-linear relationship is known. Thus, in various other embodiments, a reference object may comprise a curved ramp, or curving periodic features, or the like, that vary in a prescribed and known manner.

As shown in FIG. 19C, a similar principle may be employed to add a periodic feature to a relative planar reference object 1700", which is similar to the previously described relatively planar reference object 415'. The periodic features of the reference object 1700" may be provided by precision etching to a depth that is clearly distinguishable in a contour image, or by other suitable means.

While the preferred embodiment of the invention has been illustrated and described, numerous variations in the illustrated and described arrangements of features and sequences of operations will be apparent to one skilled in the art based on this disclosure. It will be appreciated that various aspects of the invention may be used separately, or in different combinations than those specifically described herein, and substantial benefits may be provided in various applications. Thus, it will be appreciated that various changes can be made therein without departing from the spirit and scope of the invention.

The embodiments of the invention in which an exclusive property or privilege is claimed are defined as follows:

1. A hand-size dimensional metrology imaging device, the device comprising:
   an imaging portion having a field of view;
   an illumination stripe generating portion that projects an illumination stripe along an illumination stripe plane to the field of view;
   a display portion;
   a reference object having a reference object feature positioned in the field of view and extending along a y-axis direction that is nominally perpendicular to the illumination stripe plane, the reference object feature having a dimension along a direction parallel to the illumination stripe plane that varies according to a known relationship with a changing position along the y-axis direction;
   a signal processing and control portion comprising a scan acquisition portion and a surface map determining portion;
   wherein;
   the illumination stripe generating portion is arranged to illuminate a stripe on a workpiece surface in the field of view and on the reference object feature, when a scan of the workpiece is performed;
   the imaging portion is configured to provide contour image data to the signal processing and control portion for a plurality of contour images during the scan, corresponding to a plurality of scan positions along the y-axis direction relative the workpiece, each contour image including a workpiece portion comprising an image of the illumination stripe on the workpiece surface and a reference object portion comprising an image of the illumination stripe on the reference object feature;
   the signal processing and control portion is configured to input the contour image data and determine a surface map for a scanned portion of the workpiece surface, wherein the surface map comprises three-dimensional workpiece surface coordinate information corresponding to the scanned portion of the workpiece surface; and
   the signal processing and control portion is configured to determine respective x- and z-axis workpiece surface coordinate information based on the workpiece portion of a respective contour image, and to determine the y-axis workpiece surface coordinate information associated with that contour image by analyzing the reference object portion of the contour image, wherein the z-axis is nominally parallel to the illumination stripe plane and a plane that is nominally parallel to the y-axis direction and an optical axis of the imaging portion, and the x-axis is nominally parallel to the illumination stripe plane and orthogonal to the z-axis.

2. The metrology imaging device of claim 1, further comprising a user interface comprising at least one user-adjustable video measurement tool configurable relative to a surface map display on the display portion, and a plurality of control elements, the control elements comprising a scan acquisition element.

3. The metrology imaging device of claim 2, further comprising at least one preprogrammed measurement function that operates to provide a dimensional measurement result based at least on the configuration of the video measurement tool, wherein the preprogrammed measurement function returns at least one of (a) a z-axis height coordinate value corresponding to a location on the workpiece surface, and (b) a difference between two z-axis height coordinate values corresponding to two locations on the workpiece surface.

4. The metrology imaging device of claim 2, wherein the imaging portion, the illumination stripe generating portion and the display portion are rigidly mounted relative to one another, and the metrology imaging device is configured to fit within a volume at least as small as 120 cubic inches.

5. The metrology imaging device of claim 1, wherein the reference object feature comprises at least one of (a) a ramp feature having z-axis height that changes along the y-axis direction, (b) a triangular feature included along a surface nominally parallel to the x-y plane, the triangular feature having an x-axis width that changes along the y-axis direction, (c) a periodic feature included along a ramp feature, the periodic feature having an x-axis width that changes along the y-axis direction, and (d) a periodic feature included along a surface nominally parallel to the x-y plane, the periodic feature having an x-axis width that changes along the y-axis direction.

6. The metrology imaging device of claim 1, wherein the metrology imaging device comprises a conventional-imaging illumination portion arranged to illuminate at least a portion of the workpiece surface, the imaging portion is configured to provide conventional image data to the signal processing and control portion, the conventional image data corresponding to a plurality of conventional images of the workpiece surface acquired at times interspersed with times of the plurality of contour images during the scan, and the signal processing and control portion is configured to input the conventional image data and determine the displacements between pairs of the conventional images across an image sensor of the imaging portion with sub-pixel resolution, using an image correlation technique.

7. The metrology imaging device of claim 1, wherein a Scheimpflug configuration is utilized such that the illumination stripe plane coincides with an object plane of the imaging portion; and the object plane, a lens-plane and an image-plane of the imaging portion nominally intersect in the same line.

8. The metrology imaging device of claim 4, wherein the user adjustable video measurement tool includes a preprogrammed measurement function that automatically determines at least one of a maximum z-height location and a minimum z-height location for the scanned portion of the workpiece surface.

9. The metrology imaging device of claim 8, wherein the user interface is configured to include a feature such that after one of the maximum z-height location and the minimum z-height location is determined, the user may make a selection using the feature to produce a relative z-height measurement that uses the determined z-height location as a reference height.

10. The metrology imaging device of claim 4, wherein the at least one user-adjustable video measurement tool comprises at least one of (a) a manual point-to-point distance measurement tool, and (b) a point-to-line distance measurement tool.

11. The metrology imaging device of claim 4, wherein the user adjustable video measurement tool includes a preprogrammed measurement function that provides automatic edge detection, and determines a measurement result based at least partly on the results of the automatic edge detection.

12. The metrology imaging device of claim 1, wherein the imaging portion, the illumination stripe generating portion and the display portion are rigidly mounted relative to one another, and the metrology imaging device is configured to fit within a volume at least as small as 120 cubic inches.

13. A method for operating a hand-size dimensional metrology imaging device, the method comprising:
   performing a scan of a workpiece using the metrology imaging device, including moving the metrology imaging device relative to the workpiece along a y-axis direction;

locating a reference object proximate to the workpiece prior to the scan, wherein the reference object comprises a reference object feature extending along the y-axis direction, the reference object feature having a dimension along a direction perpendicular to the y-axis direction that varies according to a known relationship with a changing position along the y-axis direction;

operating an illumination stripe generating portion of the metrology imaging device to provide an illumination stripe across both a surface of the workpiece and the reference object feature when the scan of the workpiece is performed;

operating an imaging portion of the metrology imaging device to acquire a plurality of contour images corresponding to a plurality of scan positions along the y-axis direction of the illumination stripe on the workpiece surface during the scan, each contour image including a workpiece portion comprising an image of the illumination stripe on the workpiece surface and a reference object portion comprising an image of the illumination stripe on the reference object feature; and determining a surface map for a scanned portion of the workpiece surface based on the acquired contour images, wherein:

the surface map comprises three-dimensional workpiece surface coordinate information corresponding to the scanned portion of the workpiece surface; and respective x- and z-axis workpiece surface coordinate information is determined based on the workpiece portion of a respective contour image, and the y-axis workpiece surface coordinate information associated with that contour image is determined by analyzing the reference object portion of the contour image, wherein the z-axis is nominally parallel to an illumination stripe plane that coincides with the illumination stripe and a plane that is nominally parallel to the y-axis direction and an optical axis of the imaging portion, and the x-axis is nominally parallel to the illumination stripe plane and orthogonal to the z-axis.

14. The method of claim 13, further comprising:

displaying a display version of the surface map on a display of the metrology imaging device;

using a user interface comprising a plurality of control elements, at least one user-adjustable video measurement tool that is configurable relative to the version of the surface map on the display, and a preprogrammed measurement function, to configure the user-adjustable video measurement tool relative to a feature included in the version of the surface map, on the display; and determining at least one of (a) a z-axis height coordinate value corresponding to a location on the workpiece surface, and (b) a difference between two z-axis height coordinate values corresponding to two locations on the workpiece surface, based on the configured user-adjustable video measurement tool and operation of the preprogrammed measurement function.

15. The method of claim 14, comprising providing the entire hand-size dimensional metrology imaging device that is operated according to the method within a volume at least as small as 120 cubic inches.

16. The method of claim 13, wherein a Scheimpflug configuration is utilized such that the illumination stripe plane coincides with an object plane of the imaging portion; and the object plane, a lens-plane and an image-plane of the imaging portion of the metrology imaging device nominally intersect in the same line.

* * * * *

UNITED STATES PATENT AND TRADEMARK OFFICE
CERTIFICATE OF CORRECTION

PATENT NO. : 7,400,414 B2
APPLICATION NO. : 11/263600
DATED : July 15, 2008
INVENTOR(S) : J. D. Tobiason et al.

It is certified that error appears in the above-identified patent and that said Letters Patent is hereby corrected as shown below:

| COLUMN | LINE | ERROR |
|---|---|---|
| On the Title page: | | |
| Pg. 1, col. 2 | Assistant Examiner | "Rebecca C Slomski" should read --Rebecca C. Slomski-- |
| Column 27 (Claim 1, line 18) | 18 | "wherein;" should read --wherein:-- |
| Column 30 (Claim 14, line 10) | 15 | after "surface map" delete "," |

Signed and Sealed this

Fourteenth Day of April, 2009

JOHN DOLL
*Acting Director of the United States Patent and Trademark Office*